(12) United States Patent
Hall et al.

(10) Patent No.: US 10,781,138 B2
(45) Date of Patent: Sep. 22, 2020

(54) ADDITIVE OF CELLULOSE NANOFIBRILS OR NANOCRYSTALS AND A SECOND POLYMER

(71) Applicant: Halliburton Energy Services, Inc., Houston, TX (US)

(72) Inventors: Lee J. Hall, Houston, TX (US); Jay P. Deville, Houston, TX (US); Orlando J. Rojas, Raleigh, NC (US); Carlos A. Carrillo, Raleigh, NC (US); Carlos L. Salas, Raleigh, NC (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/529,161

(22) PCT Filed: Dec. 19, 2014

(86) PCT No.: PCT/US2014/071377
§ 371 (c)(1),
(2) Date: May 24, 2017

(87) PCT Pub. No.: WO2016/099534
PCT Pub. Date: Jun. 23, 2016

(65) Prior Publication Data
US 2017/0341979 A1 Nov. 30, 2017

(51) Int. Cl.
| | | |
|---|---|---|
| *C09K 8/10* | (2006.01) |
| *C04B 20/10* | (2006.01) |
| *C04B 28/02* | (2006.01) |
| *C09K 8/42* | (2006.01) |
| *C09K 8/508* | (2006.01) |
| *C09K 8/68* | (2006.01) |
| *C09K 8/90* | (2006.01) |
| *C09K 8/88* | (2006.01) |
| *C09K 8/467* | (2006.01) |

(52) U.S. Cl.
CPC ...... *C04B 20/1037* (2013.01); *C04B 20/1048* (2013.01); *C04B 28/02* (2013.01); *C09K 8/10* (2013.01); *C09K 8/42* (2013.01); *C09K 8/508* (2013.01); *C09K 8/68* (2013.01); *C09K 8/88* (2013.01); *C09K 8/90* (2013.01); *C09K 8/467* (2013.01); *C09K 2208/08* (2013.01); *C09K 2208/10* (2013.01)

(58) Field of Classification Search
CPC .. C09K 2208/08; C09K 2208/10; C09K 8/10; C09K 8/68; C09K 8/90; C09K 8/035; C09K 21/14; C09K 8/64; C09K 21/12; C09K 8/34; C09K 8/42; C09K 8/467; C09K 8/487; C09K 8/514; C09K 8/62; C09K 8/88; C09K 11/025; C09K 11/883; C09K 13/00; C09K 19/02; C09K 19/3402; C09K 19/3819; C09K 2019/523; C09K 2208/30; C09K 3/18; C09K 8/32; C09K 8/40; C09K 8/424; C09K 8/48; C09K 8/5045; C09K 8/508; C09K 8/516; C09K 8/5758; C09K 8/58; C09K 8/588; C09K 8/602; C09K 8/665; C09K 8/685; C09K 8/70; C09K 8/80; C09K 8/82; C09K 8/887; C09K 8/92; E21B 21/003; E21B 33/138; E21B 21/062; E21B 33/13; E21B 43/20; E21B 43/25
See application file for complete search history.

(56) References Cited

U.S. PATENT DOCUMENTS

| | | |
|---|---|---|
| 6,348,436 B1 | 2/2002 | Langlois et al. |
| 9,133,384 B2 | 9/2015 | Rincon-Torres et al. |
| 9,469,802 B2 | 10/2016 | Hall |
| 2011/0036522 A1 | 2/2011 | Ankerfors et al. |
| 2012/0015852 A1 | 1/2012 | Quintero |
| 2013/0153234 A1 * | 6/2013 | Bobier ................ C09K 8/68 166/308.2 |
| 2013/0196883 A1 | 8/2013 | Rincon-Torres et al. |
| 2013/0274149 A1 * | 10/2013 | Lafitte ................ C09K 8/905 507/112 |
| 2014/0349894 A1 | 11/2014 | Quintero et al. |
| 2016/0168272 A1 * | 6/2016 | Retsina ................ C08B 15/02 162/9 |

FOREIGN PATENT DOCUMENTS

| | | |
|---|---|---|
| AU | 2014413960 B2 | 2/2018 |
| WO | 2011089323 A1 | 7/2011 |
| WO | 2014017911 A1 | 1/2014 |
| WO | 2014085729 A1 | 6/2014 |

OTHER PUBLICATIONS

International Search Report and Written Opinion dated Sep. 14, 2015; International PCT Application No. PCT/US2014/071377.
Australian Government IP Australia, Examination Report No. 1, Application No. 2014413960, dated Jun. 26, 2017.
Argentine Office Action in Application No. 20150103488, dated Feb. 5, 2020.

\* cited by examiner

*Primary Examiner* — Kumar R Bhushan
(74) *Attorney, Agent, or Firm* — McGuireWoods, LLP

(57) ABSTRACT

A wellbore treatment fluid comprising: a base fluid; and an additive comprising: a first polymer bundle selected from the group consisting of cellulose nanofibrils, cellulose nanocrystals, and combinations thereof; and a second polymer, wherein the second polymer attaches to the first polymer bundle by a non-covalent mechanism. A method of treating a portion of a wellbore comprising: introducing the treatment fluid into the wellbore.

16 Claims, 25 Drawing Sheets

ADDITIVE OF CELLULOSE NANOFIBRILS OR NANOCRYSTALS AND A SECOND POLYMER

TECHNICAL FIELD

Polymer additives can be used in a variety of wellbore operations. The additive can perform a variety of functions including a viscosifier, cement additive, fluid loss control additive, and rheology modifier. The additive can be made of two different polymers connected via non-covalent bonds. At least one of the polymers can be cellulose nanofibrils or cellulose nanocrystals.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
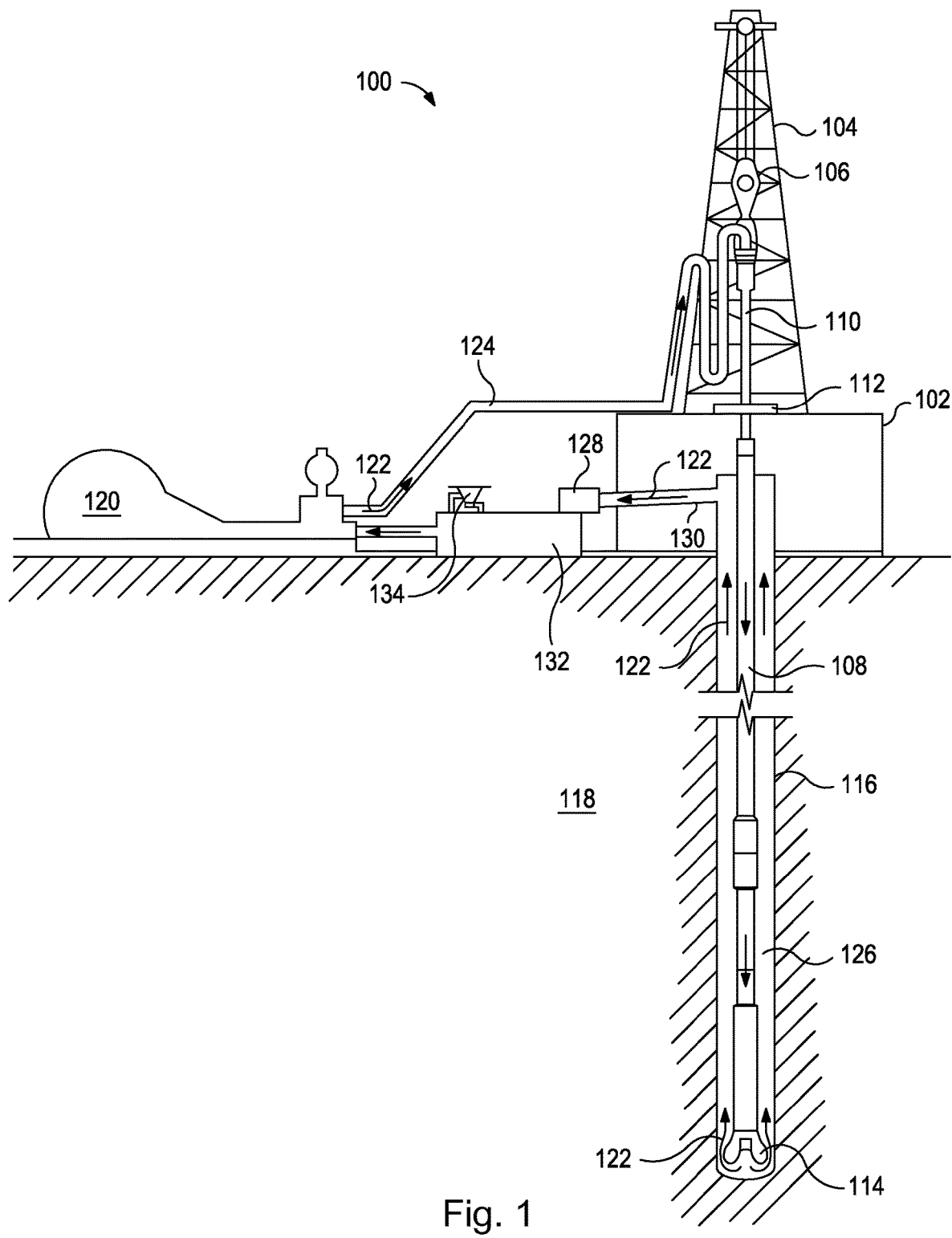
FIG. 1 is a diagram illustrating a well system according to certain embodiments.

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megaPascals "MPa"). A fluid can be a liquid or gas. A homogenous fluid has only one phase; whereas a heterogeneous fluid has more than one distinct phase. A heterogeneous fluid containing dispersed particles with sizes in the micrometer range is an example of a colloidal dispersion. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Additives can be used in treatment fluids. Additives can be used as a viscosifier, rheology modifier, gelling agent, and fluid loss control additive. There exists a need for improved additives that provide desirable fluid properties while being thermally stable. It has been discovered that an additive of cellulose nanofibrils or nanocrystals and a non-covalently bonded polymer can be used as an additive for oil and gas fluids.

A polymer is a large molecule composed of repeating units, typically connected by covalent chemical bonds. A polymer is formed or synthesized from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the degree of polymerization and defines the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

In a copolymer, the repeating units from each of the monomer residues can be arranged in various manners along the polymer chain. For example, the repeating units can be random, alternating, periodic, or block. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules.

If any laboratory test (e.g., rheology or fluid loss) requires the step of mixing, then the treatment fluid is mixed according to the following procedures. A known volume (in units of barrels) of the base fluid is added to a mixing container and the container is then placed on a mixer base. The motor of the base is then turned on and maintained at 10,000 to 12,000 revolutions per minute (rpm). The additives are then added to the base fluid and mixed for at least 2 minutes. The additives can be added at a stated concentration of weight by volume of the base fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the treatment fluid is ramped up to the specified temperature and possibly pressure, the fluid is maintained at that temperature and pressure for the duration of the testing.

A fluid should exhibit good rheology. Rheology is a measure of how a material deforms and flows under stress. As used herein, the "rheology" of a fluid is measured as follows. The fluid is mixed and placed into the rheometer. All the rheometric measurements were carried out using an AR-2000 rheometer from TA instruments. The geometry used parallel plates with a gap of 1 millimeter "mm." For oscillatory tests, the stress was kept constant at 0.5 Pascal "Pa," and for oscillatory temperature scans, the stress was kept constant at 0.5 Pascal "Pa" and the frequency at 0.5 Hertz "Hz." The Herschel-Bulkley model was applied to the experimental data according to the following equation:

$$\tau = \tau_0 + k * \gamma^n$$

where $\tau$=shear stress; $\tau_0$=yield stress; k=viscosity index; $\gamma$=shear rate; and n=flow index. The yield stress ($\tau_0$) is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. The shear rate ($\gamma$) is the rate at which a progressive shearing deformation is applied to the material and can be calculated, in the case or parallel plate geometries, as the velocity of the moving plates divided by the distance between the 2 parallel plates. A flow index (n) of less than 1 indicates the fluid has shear thinning behavior; whereas a flow index greater than 1 indicates the fluid has shear thickening behavior.

Viscosity is a measure of how resistant a material is to shear forces and to flow freely. A viscous material (e.g., honey) resists flow; while a less viscous material (e.g., freshwater) flows freely. The apparent viscosity ($\eta$) is calculated at a given shear rate, in the present case of $0.01 \text{ sec}^{-1}$ as $\tau/\gamma$ and reported in units of Pa*sec.

A fluid can develop gel strength. One way to determine the gelation of a fluid is to measure the elastic modulus and loss modulus of the fluid. Storage modulus (G') is a measure of the tendency of a substance to be deformed elastically (i.e., non-permanently) when a force is applied to it and returned to its normal shape. Storage modulus is expressed in units of pressure, for example, Pa or dynes/cm². Loss modulus (G") is a measure of the energy lost when a substance is deformed. G" is also expressed in units of pressure, for example, Pa or dynes/cm². When comparing G' to G" the units of both G' and G" should be the same. The force is normally measured in rad/sec.

As used herein, the storage modulus (G') and loss modulus (G") are determined as follows using an advanced rheometer such as a TA Instruments AR-2000 or similar with parallel plates geometry. The treatment fluid is mixed and then placed into the rheometer. The treatment fluid is tested at a specified temperature and ambient pressure (1 atmosphere). The upper plate is oscillated at a constant stress of 0.5 Pa. The temperature is held constant at 77° F. (25° C.). For the oscillatory temperature scans, the temperature is increased from 77° F. (25° C.) to 158° F. (70° C.) and then the fluid is cooled down back to 77° F. (25° C.). If both G'>G" and G'>1 Pa at at least one point over a range of points from about 0.01 Hz to about 10 Hz at a given temperature, then the fluid is considered to be viscoelastic at that temperature. A fluid is considered to be viscoelastic if at least one of the above tests is satisfied.

Thermogravimetric analysis can be performed to determine the thermal stability and the amount of decomposition of a substance due to heat. As used herein, a "thermal profile" is performed using thermogravimetric analysis as follows. A known amount of a substance is placed into a TGA instrument with heating capacity and a balance to weigh the sample. The sample is started at 100 weight % at a particular temperature. The substance is then heated to a final temperature, with weight % readings taken during the course of the temperature increase. The weight % of the sample is plotted against the temperature to produce the thermal profile of the substance. The graph can be used to determine in what temperature range the substance is thermally stable. As used herein, a substance is considered "thermally stable" up to the degradation temperature of the substance (i.e., the temperature at which the onset of degradation begins). By way of example, a substance may begin degrading, indicated by a decline in weight %, at a temperature of 150° F. (66° C.), which means that the substance is thermally stable at temperatures less than and equal to 150° F. (66° C.).

Another desirable property of a treatment fluid is low fluid loss. As used herein, the "fluid loss" of a fluid is tested at a specified temperature and pressure differential as follows. The fluid is mixed. The drilling fluid is poured into a filter cell. The testing apparatus is assembled with a filter paper inserted into the apparatus. The specified pressure differential is set. A timer is started and filtrate out of the testing apparatus is collected in a separate pre-weighed container. The testing is performed for 30 min. The total weight in grams (g) of the filtrate collected is recorded over the 30 min. Generally, a fluid with a filtrate of less than about 2 g in 30 min is considered low or acceptable fluid loss.

According to certain embodiments, a wellbore treatment fluid comprises: a base fluid; and an additive comprising: a first polymer bundle selected from the group consisting of cellulose nanofibrils, cellulose nanocrystals, and combinations thereof; and a second polymer, wherein the second polymer attaches to the first polymer by a non-covalent mechanism.

According to certain other embodiments, a method of treating a portion of a wellbore comprises: introducing the treatment fluid into the wellbore.

It is to be understood that the discussion of preferred embodiments regarding the treatment fluid or any ingredient in the treatment fluid (e.g., the first and second polymers) are intended to apply to the method, treatment fluid, and system embodiments. Any reference to the unit "gallons" means U.S. gallons.

The treatment fluid includes a base fluid. The treatment fluid can be a heterogeneous fluid, wherein the base fluid is the continuous phase. Any of the phases of a heterogeneous fluid can include dissolved substances or undissolved solids. The base fluid can include water. The water can be selected from the group consisting of freshwater, saltwater, sea water, brackish water, and combinations thereof. The base fluid can include dissolved substances or undissolved substances. For example, the base fluid can contain a water-soluble salt. Examples of water-soluble salts include sodium chloride, calcium chloride, potassium chloride, magnesium chloride, potassium acetate, potassium formate, magnesium sulfate, and combinations thereof.

The treatment fluid can be, without limitation, a drilling fluid, a drill-in fluid, a packer fluid, a completion fluid, a spacer fluid, a work-over fluid, an insulating fluid, a cement composition, or a stimulation fluid (e.g., a fracturing fluid). The treatment fluid can be introduced into the well prior to or after a second treatment fluid. As used herein, a "cement composition" is a mixture of at least cement and water (i.e., the base fluid) and possibly additives. As used herein, the term "cement" means an initially dry substance that, in the presence of water, acts as a binder to bind other materials together. An example of cement is Portland cement.

The treatment fluid can have a density greater than or equal to 9 pounds per gallon "ppg" (1.08 kilograms per liter "kg/L").

The treatment fluid also includes an additive. The additive includes a first polymer bundle selected from the group consisting of cellulose nanofibrils, cellulose nanocrystals, and combinations thereof. Cellulose is the most abundant biopolymer on earth. It is natural, renewable, and biodegradable. It is naturally synthesized by plants as well as by some specialized bacteria. Its molecular structure is constituted by a linear backbone of β-1, 4-O-glycosyl linked D-glucose residues bundled up in a microfiber. The cellulose microfiber varies in length depending on the cellulose species.

Once synthesized by plants, the cellulose microfiber contains a crystalline part, which is highly insoluble in water, and some non-crystalline parts, which have been referred to as amorphous cellulose. The cellulose microfibrils create a strong network, which is believed to be based on intermolecular hydrogen bonding. In its most common natural state, cellulose microfibers include amorphous region. The amorphous regions of the cellulose microfibers interact strongly with water.

Cellulose nanofibrils, which are fibrils containing both amorphous and crystalline domains of cellulose, can be produced by mechanical deconstruction of fibers assisted or not assisted by enzymatic or chemical pre-treatments. The length of the nanofibrils varies in the range from less than 1 micron (1,000 nm) to several micrometers. The width of the nanofibrils varies in the range of about tens of nm to about 100 nm. The ordered domains of cellulose, in the form of cellulose nanocrystals, can be isolated by simple acid hydrolysis of cellulose fibers to yield stiff and high strength nanocrystals with impressive mechanical, optical, and assembly properties. The first polymer bundle is a bundle of a single polymer (cellulose), packed together in a crystalline form in the case of the cellulose nanocrystals or in a combination of crystalline and non-crystalline forms in the case of the cellulose nanofibrils. It is to be understood that the cellulose nanofibrils can be made from pure cellulose as well as residual plant biopolymers that also include lignin and heteropolysaccharides in addition to the cellulose. It is also to be understood that the discussions may refer to "the first polymer;" however, such reference is meant to include that the first polymer is a bundle of a cellulose polymer in the form of the cellulose nanocrystals or nanofibrils without having to state that the first polymer is the bundle of cellulose polymer every time throughout.

Some of the advantages to cellulose nanofibrils and nanocrystals include: their highly-ordered structures provide improved mechanical, thermal, and chemical stability over conventional bulk cellulose (either as fibers or as water-soluble derivatives); their surfaces contain hydroxyl groups, which make them readily dispersible in water, yielding fluids with shear thinning rheology and thixotropy at relatively low concentrations; and the surface chemistry of cellulose also makes it an ideal point of attachment for further chemistry to enhance dispersion in oil or brines, or to form gels or films via specific and non-specific interactions as well as short-range hydrogen bonding.

The additive also includes a second polymer. The second polymer attaches to the first polymer by a non-covalent mechanism. The first polymer and second polymer can form a polymer network. The first polymer can form the backbone of the polymer network. The second polymer can attach to the first polymer via a non-covalent mechanism, such as hydrogen bonding via the hydroxyl groups on the cellulose, dispersion, van der Waals forces, dipole forces, and other forces, or mechanical entanglement (i.e., physical interactions). The second polymer can be in a concentration in the range of about 0.1% to about 2% by weight of the first polymer. The ratio of the second polymer to first polymer can vary and can have an effect on the resulting properties of the fluid. The ratio of the second polymer to the first polymer can be in the range of about 0.5:1 to about 4:1.

The second polymer can have an affinity or attraction to the first polymer. The affinity can be a result of opposite charges on functional groups, for example wherein the second polymer has cationic functional groups, and the first polymer has anionic functional groups. According to this embodiment, the second polymer can include cationic functional groups and can be selected from the group consisting of cationic cellulose nanofibrils; substituted methyl cellulose; chitosan; chitin; cationic polyelectrolytes containing primary, secondary, tertiary or quaternary amino groups, including cationic polyacrylamides (CPAMs), cationic starch, poly(diallyldimethyl ammonium chloride), or epichlorohydrin/dimethylamine polymers; nonionic or anionic polymers, including polyethylene glycol or lignins; and combinations thereof. The affinity can also be based on an attraction of the functional groups of the first and second polymers. By way of example, the second polymer can be a lignin, which contains aliphatic hydroxyl groups, methoxyl, carbonyl, and phenol groups in various amounts, depending on its origin, wherein the functional groups are attracted to the cellulose nanofibrils or nanocrystals by different types of non-specific interactions. A water-soluble salt, brine, or sea water can be used to enhance the attachment of the second polymer to the first polymer.

The second polymer can be water soluble. The second polymer can also provide a synergistic effect to the polymer network after interacting with the first polymer. The dual polymer system can form a polymer network due to cross-linking or mechanical entanglement of the polymers. The additive can provide a gelled fluid. The additive can provide a shear thinning behavior and low fluid loss. The additive can be, for example, a viscosifier or gelling agent, a rheology modifier, or a fluid loss control additive. The additive can also provide an increased thermal stability compared to other cellulose additives and even compared to the first polymer alone. The additive can have a thermal stability up to about 600° F. (about 316° C.).

The first polymer and the second polymer can have a wide variety of molecular weights, depending on the sources. The additive can be in a concentration in the range of about 0.1% to about 5% by weight of the base fluid.

The treatment fluid can have an fluid loss less than 5 grams (g) in 30 minutes (min) or less than 2 g in 30 min at a pressure differential of 100 psi.

The treatment fluid can have a viscosity less than or equal to a viscosity necessary to provide a pumpable fluid.

The treatment fluid can further include other additives. The additive can be any additive commonly used in treatment fluids for the wellbore operation to be performed (e.g., a drilling fluid versus a work-over fluid). Examples of additives include, but are not limited to, a weighting agent, a bridging agent, a friction reducer, a defoaming agent, elastomers, a mechanical property enhancing additive, a lost-circulation material, a filtration-control additive, a gas migration control additive, a thixotropic additive, a cement set retarder, a cement set accelerator, and combinations thereof.

The methods can further include providing the treatment fluid. The methods can further include forming the treatment fluid. The step of forming can include mixing the ingredients of the treatment fluid together using a suitable mixing apparatus. The treatment fluid can be in a pumpable state before and during introduction into the wellbore.

The methods can further include introducing a second treatment fluid into the wellbore. The methods can further include performing one or more additional wellbore operations after introduction of the treatment fluid (e.g., completing the wellbore or stimulating the subterranean formation).

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132

(i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the disclosed fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the present invention, the following examples of certain aspects of preferred embodiments are given. The following examples are not the only examples that could be given according to the present invention and are not intended to limit the scope of the invention.

For Tables 1-4 and FIGS. 2-14, several simple fluids were prepared and tested according to the procedure for the specific test in the Detailed Description above. The fluids could contain the following ingredients: water; a high charge density carboxymethylated cellulose nanofibrils "C-CNF"; chitosan; cationic cellulose nanofibrils "cat CNF"; or water-soluble methylcellulose "MC."

Cellulose nanofibrils "CNF" were produced from fully bleached cellulosic softwood fibers via mechanical deconstruction with a micro-fluidizer (Microfluidics M-110Y). The counter ions in the original pulp were all exchanged into sodium form by ionic exchange followed by a mechanical pre-treatment with a PFI mill for 5,000 revolutions.

Carboxymethylation of the fibers (C-CNF) was performed after the mechanical pre-treatment followed by the nanofibrillation of the fibers via micro-fluidization for 20 passes. The surface charge of C-CNF was −225.4 microequivalent per gram (μeq/g). The amount of chitosan required to decrease the charge of a 0.5% by weight of the water fluid of C-CNF to zero was determined with a charge demand instrument (Mutek) at a pH of 6.0 at 77° F. (25° C.). Three different chitosan concentrations, corresponding to 10%, 15%, and 20% of the total amount of chitosan required to obtain zero charge point, were carried out and the flow curves for the corresponding systems were obtained. Additions of chitosan greater than 20% of the total amount of chitosan required for the zero charge point produced extensive aggregation and made it difficult to perform any rheological evaluation.

Cat CNF was prepared by performing cationization of the cellulosic fibers after ionic exchange. A quaternary amine was used, namely 2,3-epoxypropyl trimethylammonium chloride, was used for the cationization. Nanofibrillation of the cationic fibers was carried out in a similar fashion as for the C-CNF. The surface charge for the cat CNF was +121 μeq/g.

The methylcellulose (MC) was a commercially-available product from Sigma Aldrich having a molecular weight of 88,000. Aqueous solutions of methylcellulose at 0.1%, 0.25%, and 0.5% by weight of the water were used.

Table 1 lists the ingredients and concentrations for 10 different fluids. Fluid #1 was a control fluid having just the first polymer of carboxymethylated cellulose nanofibrils (C-CNF). Fluids #2-#10 had a secondary polymer in varying concentrations of either chitosan, cationized CNF (cat CNF), or methylcellulose (MC).

TABLE 1

| Fluid # | Chitosan Conc. (g/g of C-CNF) | cat CNF Conc. (% wt. of C-CNF) | MC Conc. (% wt. of C-CNF) |
|---|---|---|---|
| 1 | — | — | — |
| 2 | 0.005 | — | — |

TABLE 1-continued

| Fluid # | Chitosan Conc. (g/g of C-CNF) | cat CNF Conc. (% wt. of C-CNF) | MC Conc. (% wt. of C-CNF) |
|---|---|---|---|
| 3 | 0.0075 | — | — |
| 4 | 0.1 | — | — |
| 5 | — | 0.1 | — |
| 6 | — | 0.25 | — |
| 7 | — | 0.5 | — |
| 8 | — | — | 0.1 |
| 9 | — | — | 0.25 |
| 10 | — | — | 0.5 |

Table 2 lists the curve fitting parameters for the Herschel-Bulkley model-yield stress ($\tau_0$), viscosity index (k), flow index (n), and apparent viscosity ($\eta$) at 0.01 sec$^{-1}$ for the fluids containing chitosan as the second polymer. As can be seen, as the concentration of the chitosan second polymer increased, the yield stress, flow index, and apparent viscosity increased and the viscosity index decreased. This indicates that the addition of chitosan can provide a more viscous fluid compared to just having the first polymer of the cellulose nanofibrils.

TABLE 2

| Fluid # | Yield Stress, $\tau_0$ (Pa) | Viscosity Index, k (Pa * s) | Flow Index, n | Apparent Viscosity, $\eta$ (Pa * s) |
|---|---|---|---|---|
| 1 | 1.4 | 0.17 | 0.7 | 4.1 |
| 2 | 1.4 | 0.13 | 0.71 | 5.1 |
| 3 | 2.1 | 0.11 | 0.73 | 10.4 |
| 4 | 2.9 | 0.08 | 0.77 | 13.8 |

Table 3 lists the curve fitting parameters for the Herschel-Bulkley model-yield stress ($\tau_0$), viscosity index (k), flow index (n), and apparent viscosity ($\eta$) at 0.01 sec$^{-1}$ for the fluids containing cat CNF as the second polymer. As can be seen, as the concentration of the cat CNF second polymer increased, the yield stress, flow index, and apparent viscosity increased and the viscosity index decreased. This indicates that the addition of cat CNF can provide a more viscous fluid compared to just having the first polymer of the cellulose nanofibrils. Moreover, the cat CNF also provides a more viscous fluid compared to the fluids containing chitosan. This indicates that the choice of the second polymer and the concentration of the second polymer can be used to provide a desired viscosity and rheological properties to a fluid.

TABLE 3

| Fluid # | Yield Stress, $\tau_0$ (Pa) | Viscosity Index, k (Pa * s) | Flow Index, n | Apparent Viscosity, $\eta$ (Pa * s) |
|---|---|---|---|---|
| 1 | 1.4 | 0.17 | 0.7 | 4.1 |
| 5 | 3.5 | 0.66 | 0.58 | 18.3 |
| 6 | 5.1 | 0.87 | 0.56 | 24 |
| 7 | 9.8 | 2.2 | 0.42 | 35.7 |

Table 4 lists the curve fitting parameters for the Herschel-Bulkley model-yield stress ($\tau_0$), viscosity index (k), flow index (n), and apparent viscosity ($\eta$) at 0.01 sec$^{-1}$ for the fluids containing methylcellulose (MC) as the second polymer. As can be seen, as the concentration of the MC second polymer increased, the yield stress, flow index, and apparent viscosity increased and the viscosity index decreased. This indicates that the addition of MC can provide a more viscous fluid compared to just having the first polymer of the cellulose nanofibrils. Moreover, the MC also provides a more viscous fluid compared to the fluids containing chitosan and cat CNF. This indicates that the choice of the second polymer and the concentration of the second polymer can be used to provide a desired viscosity and rheological properties to a fluid.

TABLE 4

| Fluid # | Yield Stress, $\tau_0$ (Pa) | Viscosity Index, k (Pa * s) | Flow Index, n | Apparent Viscosity, $\eta$ (Pa * s) |
|---|---|---|---|---|
| 1 | 1.4 | 0.17 | 0.7 | 4.1 |
| 8 | 2.0 | 2.4 | 0.43 | 21.4 |
| 9 | 2.0 | 4.6 | 0.38 | 31.2 |
| 10 | 11.1 | 2.7 | 0.47 | 99.3 |

Figure 2:
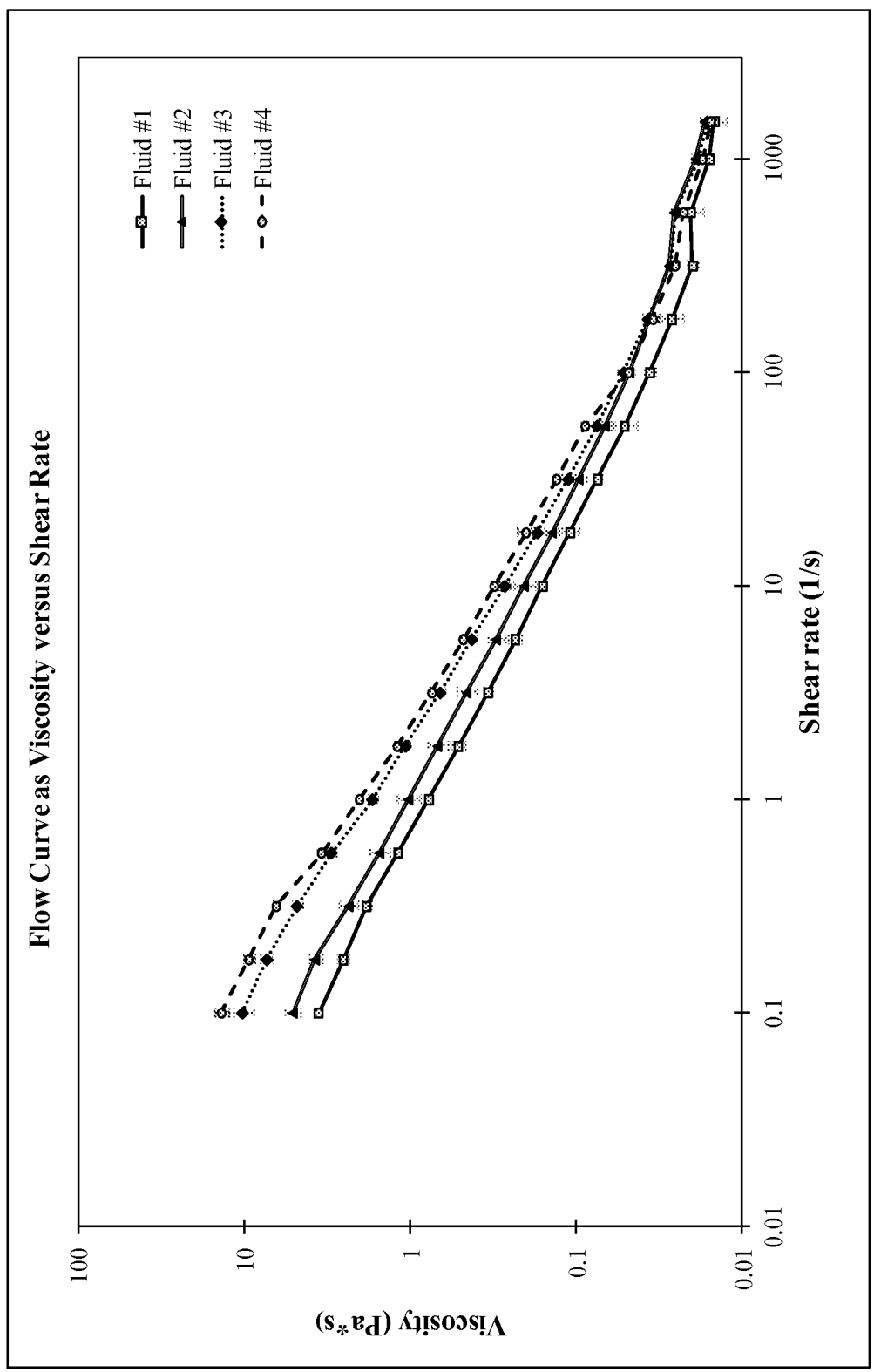
FIG. 2 is a graph of a Flow Curve as viscosity in Pascal*seconds versus shear rate in 1/seconds for 4 different fluids containing chitosan as a second monomer.
Figure 3A:
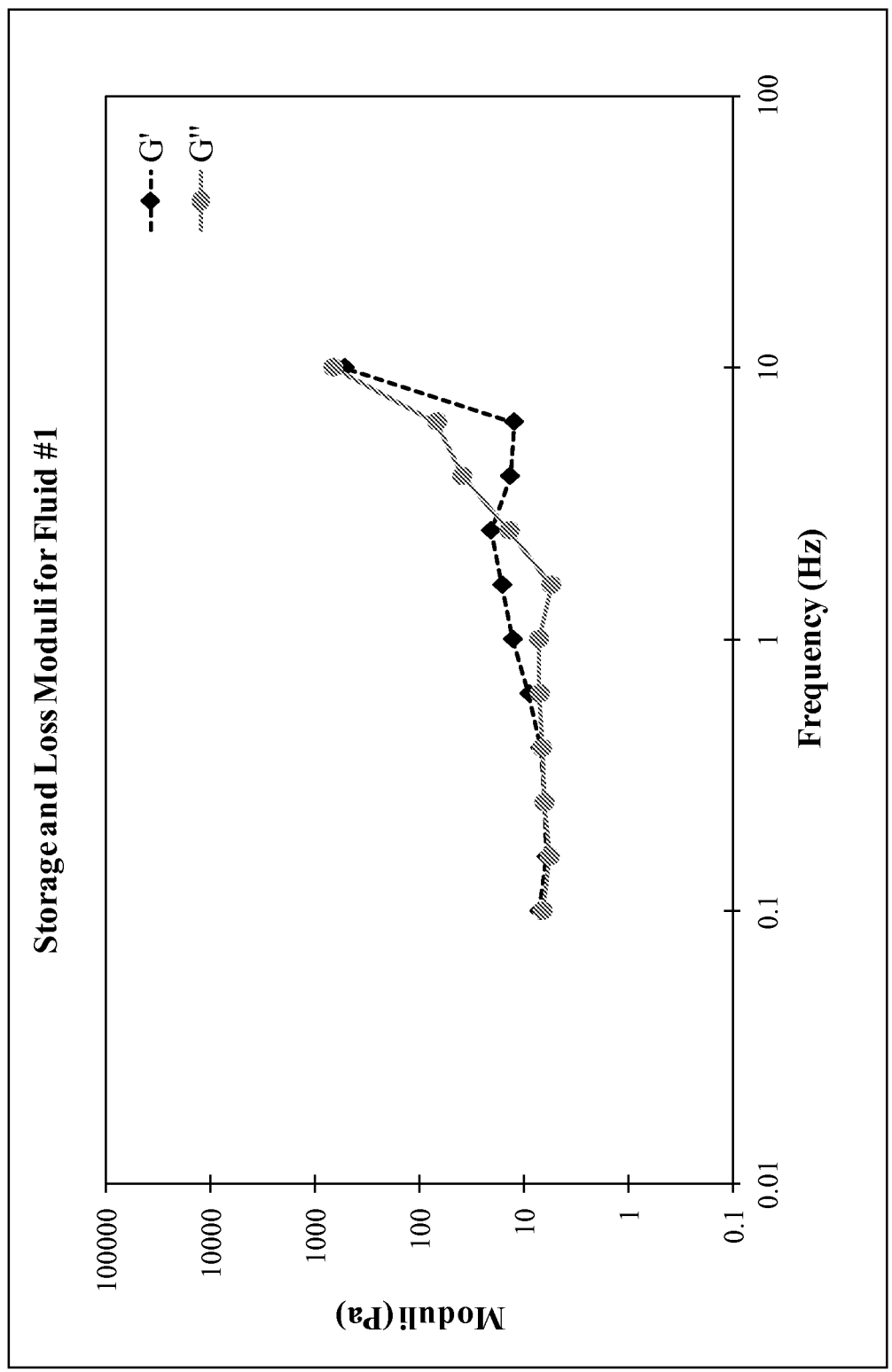
FIGS. 3A-3D are graphs of storage and loss moduli for the fluids from FIG. 2.
Figure 3B:
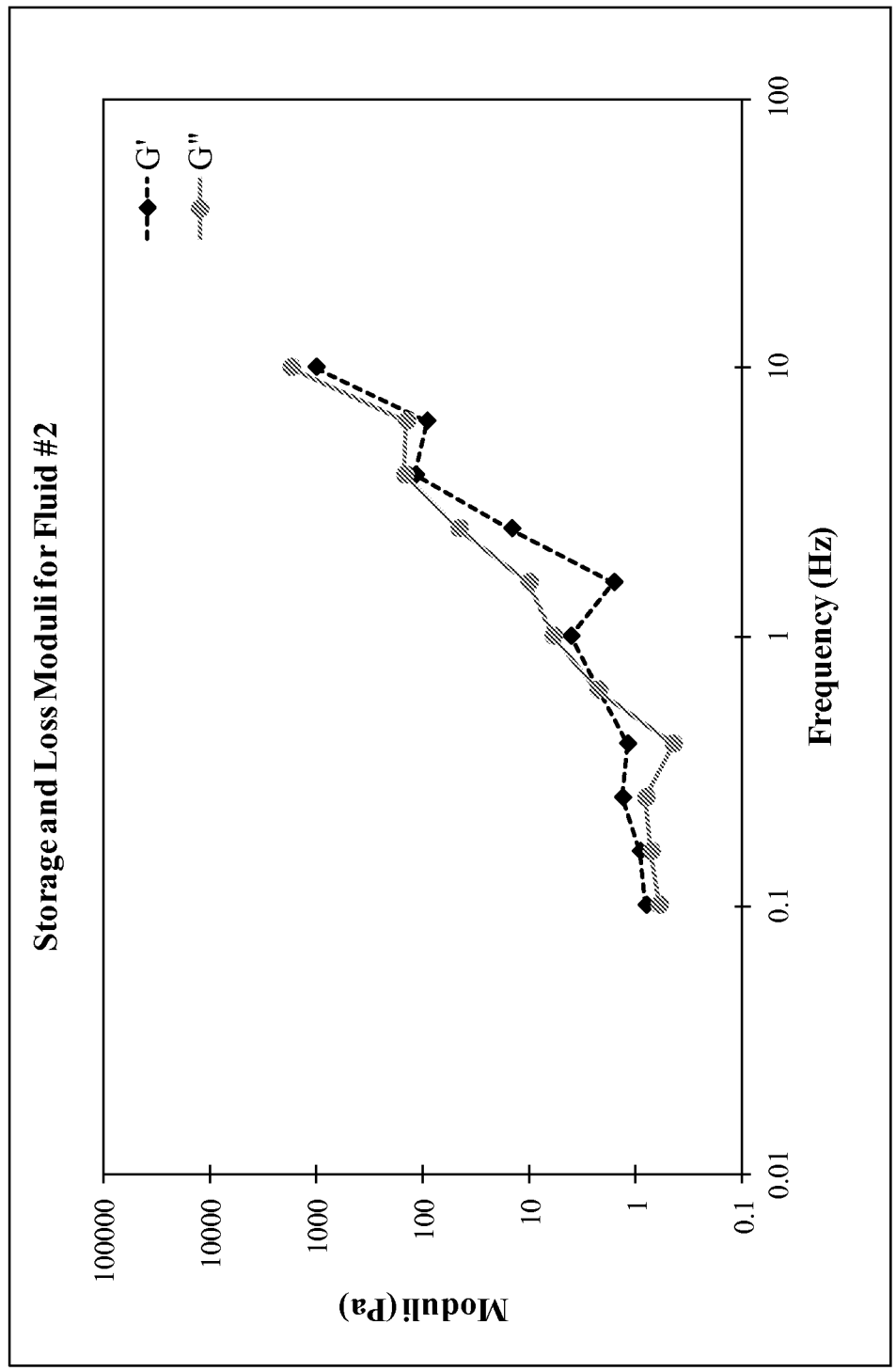
Figure 3C:
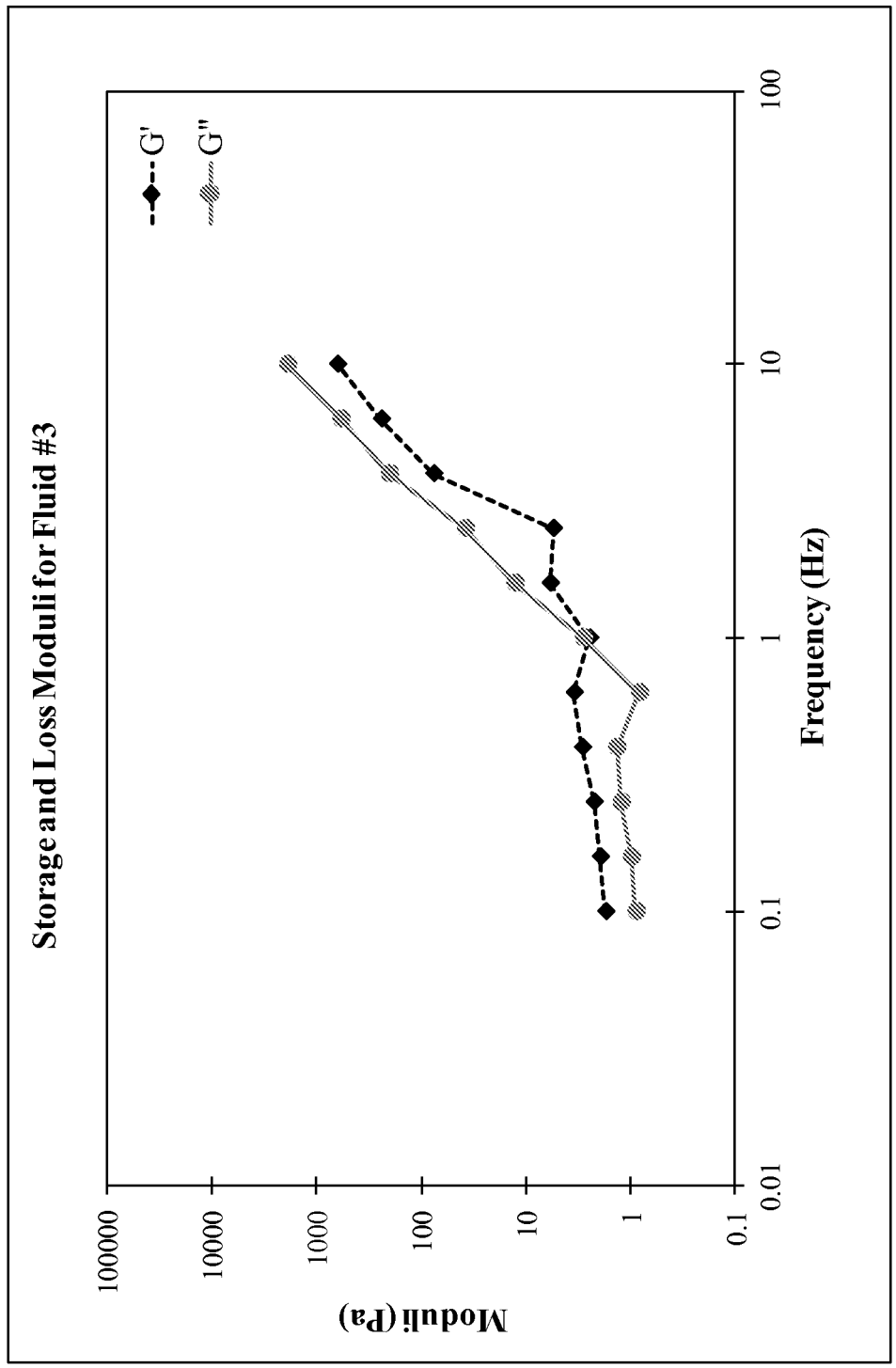
Figure 3D:
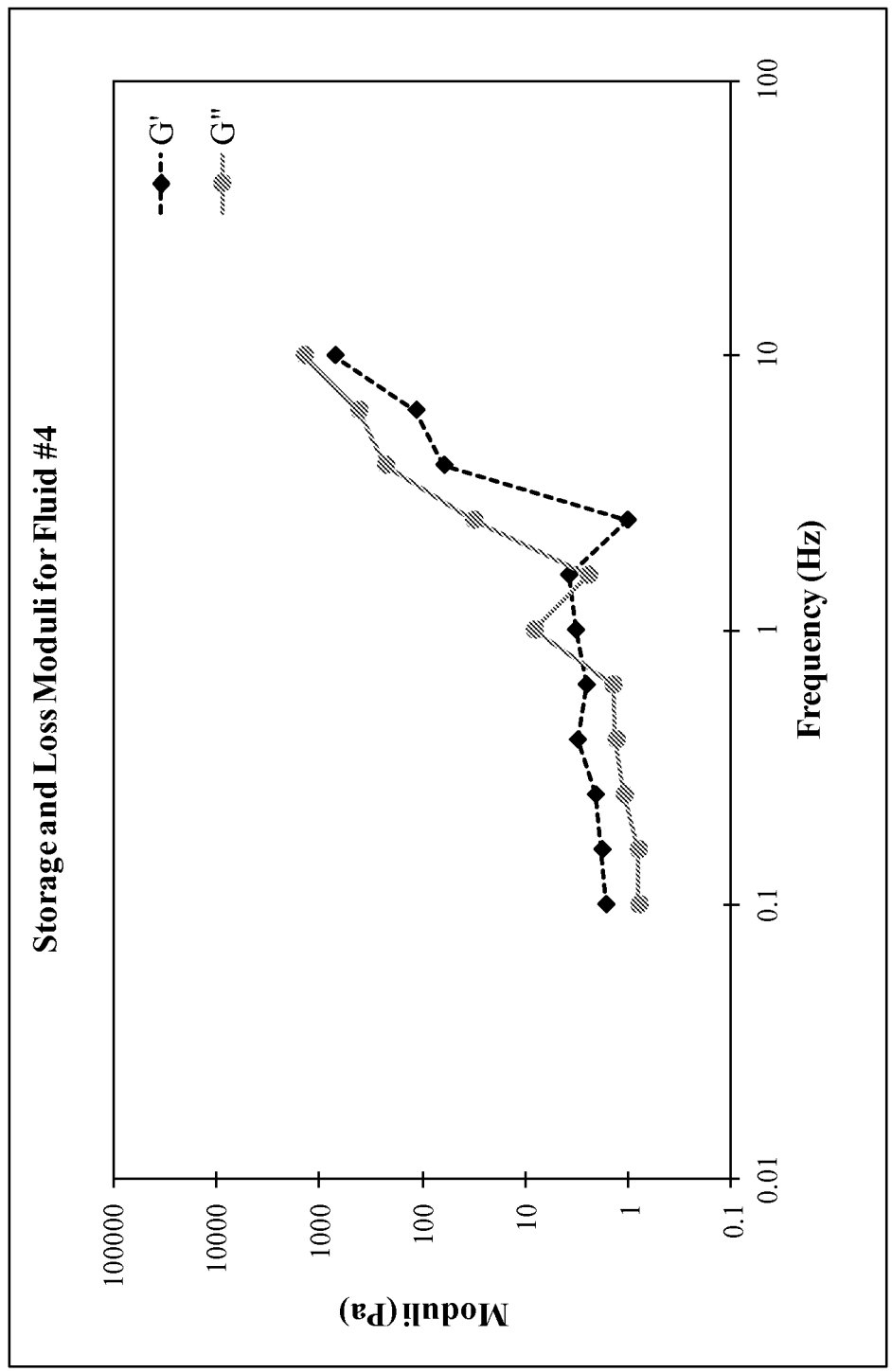

FIG. 2 is a graph of apparent viscosity (Pa*s) as a function of shear rate (1/s) for the fluids containing chitosan as the second polymer. As can be seen, as the concentration of chitosan increased, the viscosity increased. Moreover, the fluids exhibited a shear thinning behavior as the shear rate increased.

FIGS. 3A-3D are graphs of storage modulus (G') and loss modulus (G") for the fluids containing chitosan as the second polymer. As can be seen in the graphs, the fluids exhibited viscoelastic behavior. As observed in FIGS. 2 and 3A-3D, at shear rates <10 s$^{-1}$ the viscosity increased upon addition of chitosan. However, for shear rates >10 s$^{-1}$, the effect in viscosity was negligible. The yield stress increased after the addition of chitosan in amounts greater than 0.0075 g/g C-CNF. Addition of chitosan greater than 0.01 g/g C-CNF caused aggregation at pH=6.0. Finally, gel-type behavior was observed after chitosan additions of more than 0.0075 g/g C-CNF.

Figure 4:
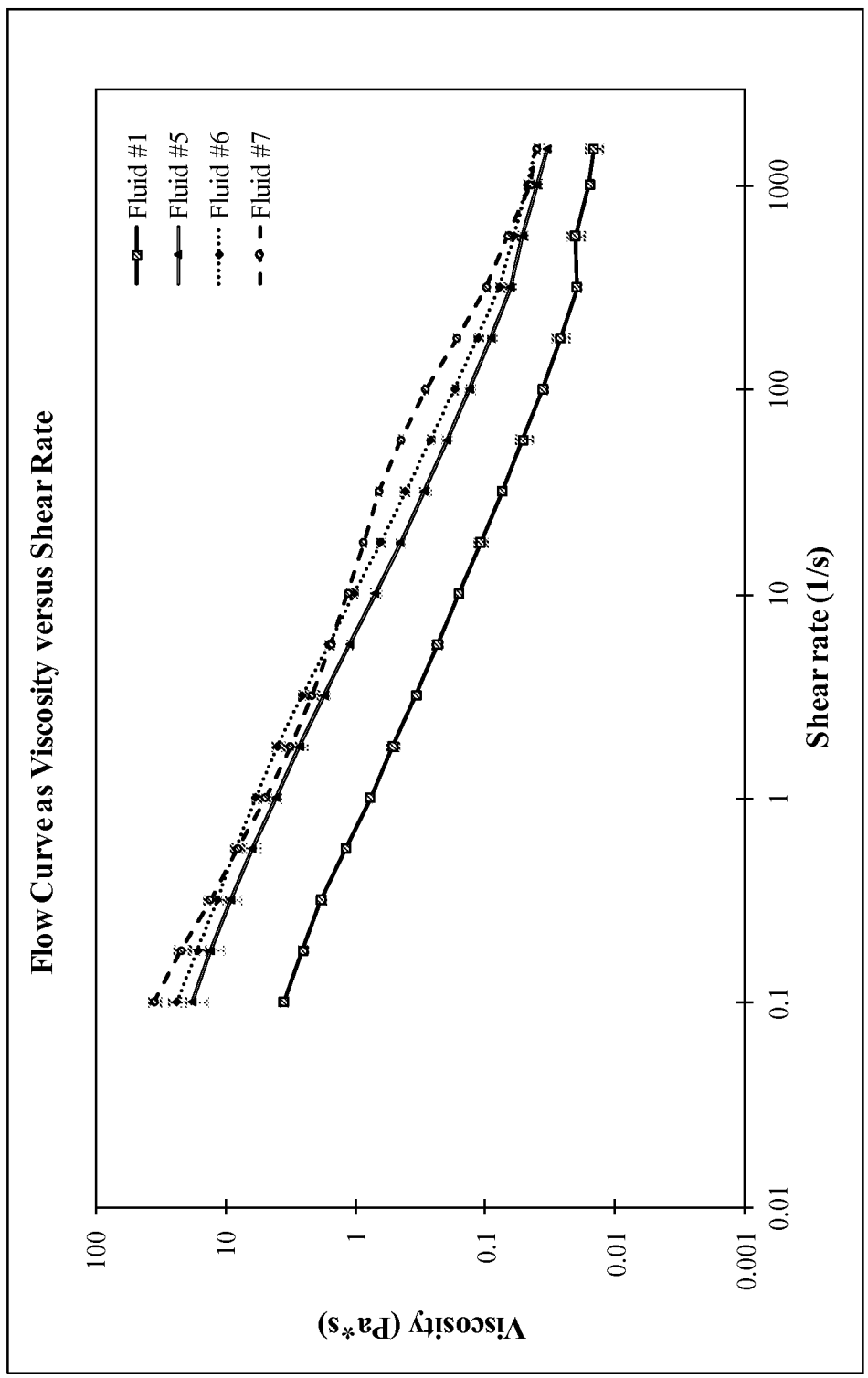
FIG. 4 is a graph of a Flow Curve as viscosity in Pascal*seconds versus shear rate in 1/seconds for 4 different fluids containing a cationic nanofibril cellulose as the second polymer.
Figure 5A:
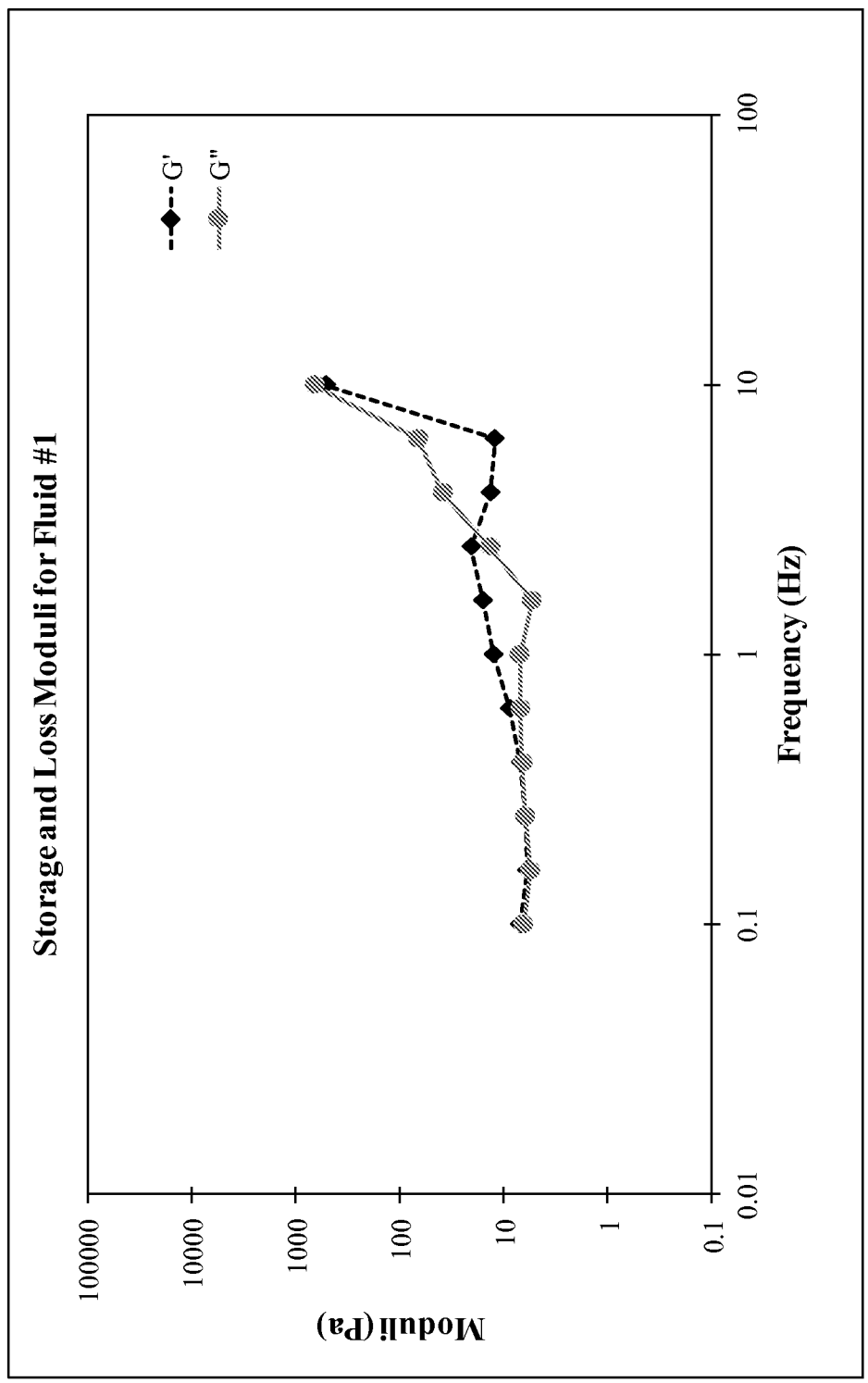
FIGS. 5A-5D are graphs of storage and loss moduli for the fluids from FIG. 4.
Figure 5B:
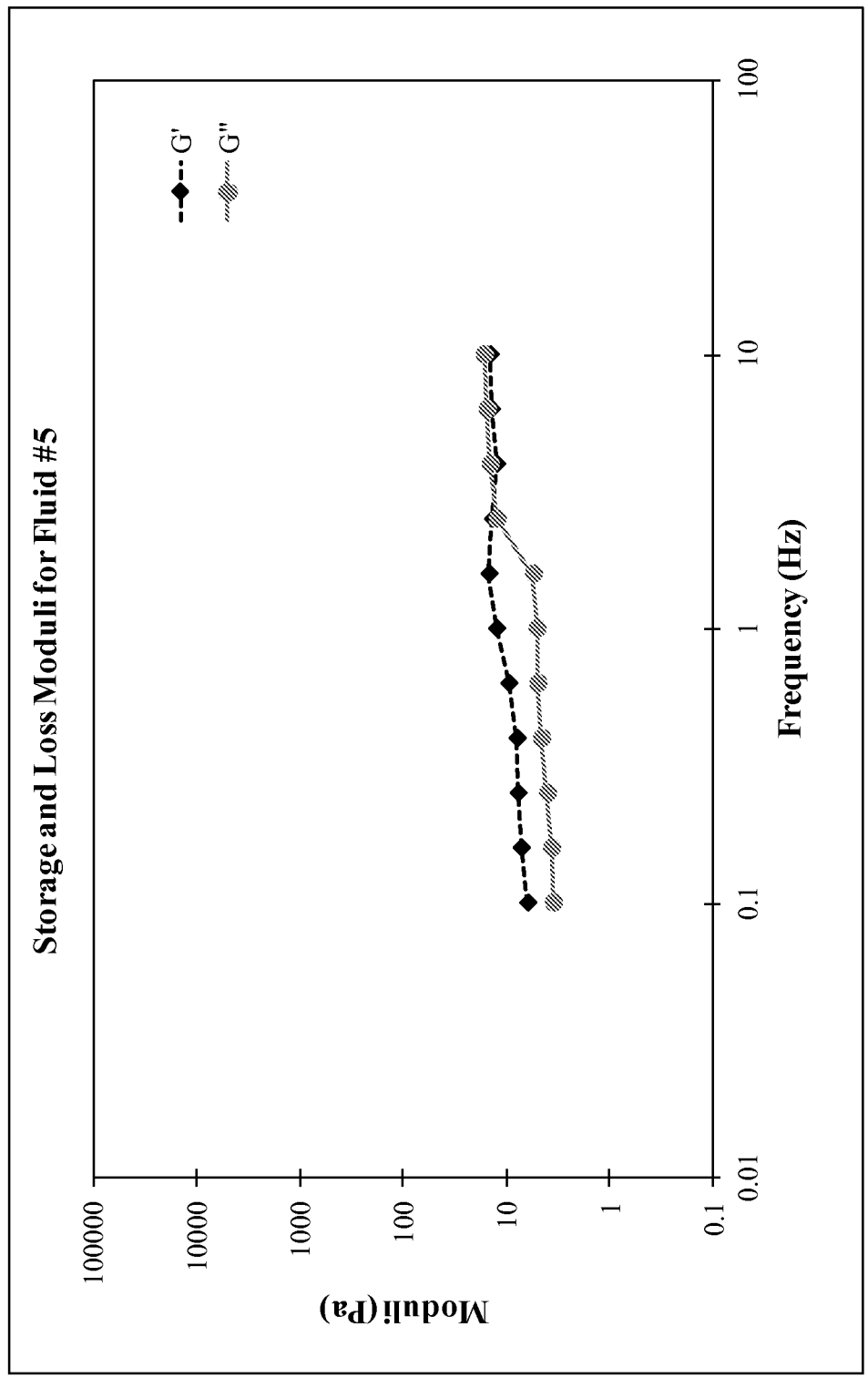
Figure 5C:
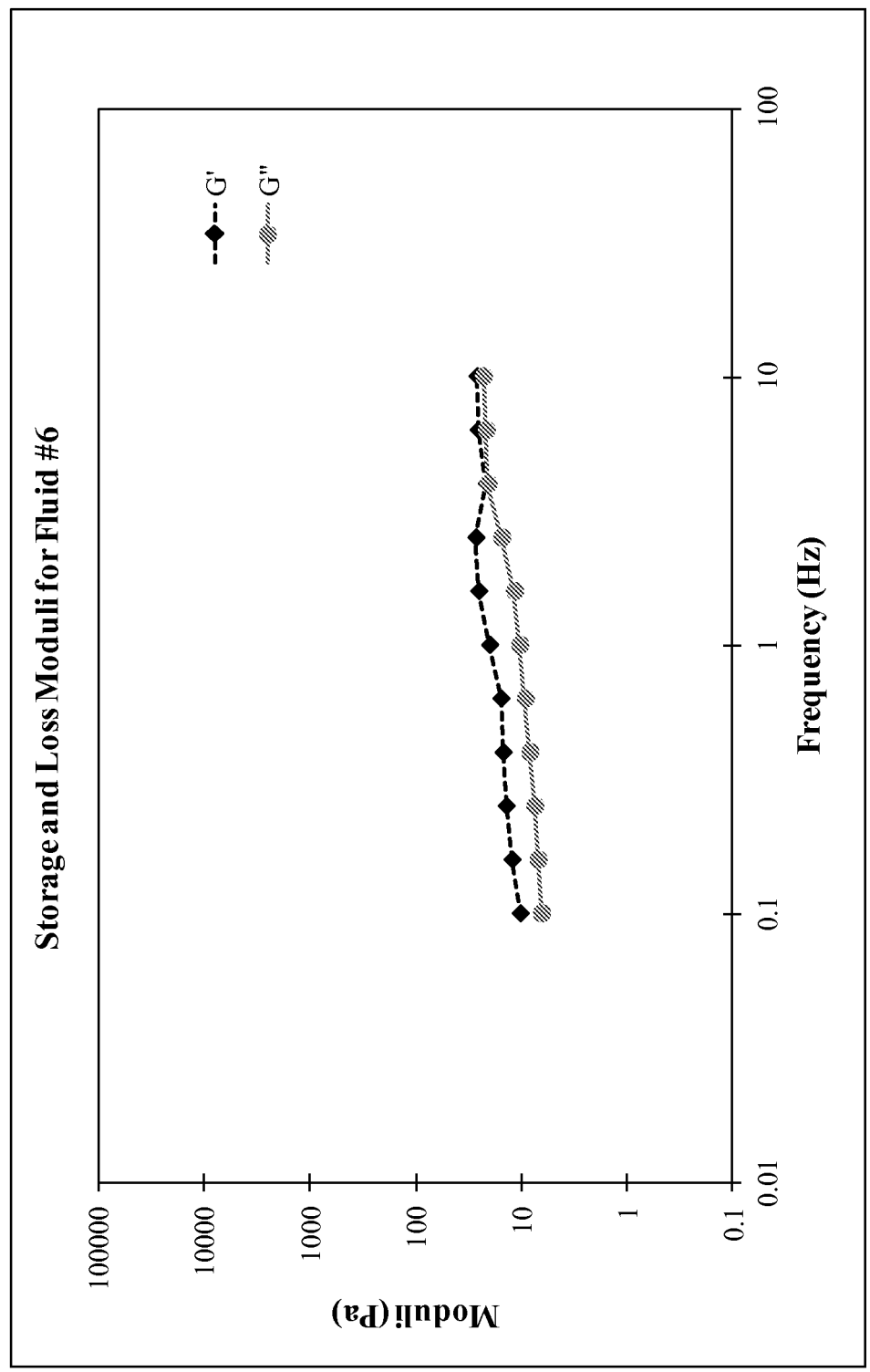
Figure 5D:
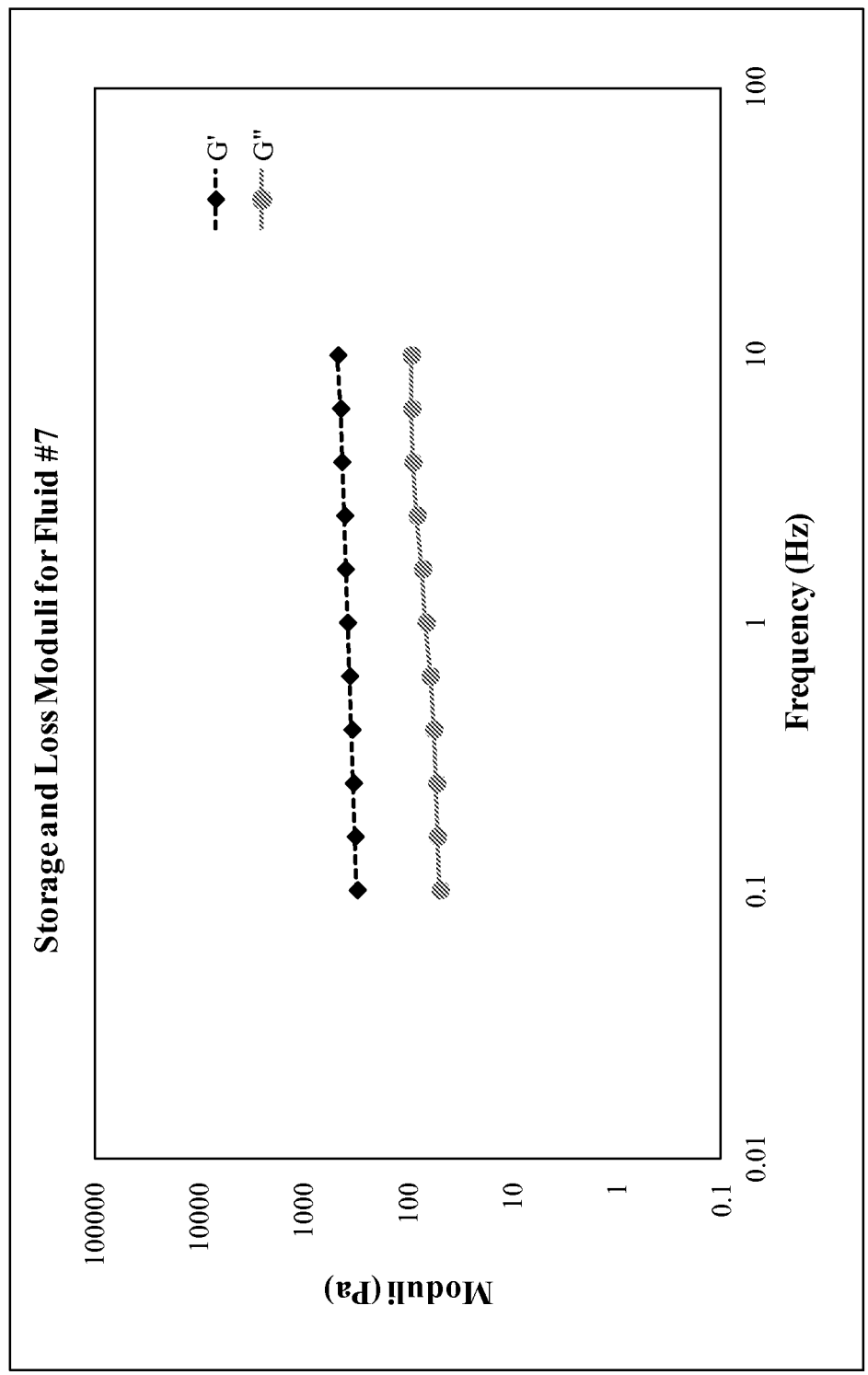

FIG. 4 is a graph of apparent viscosity (Pa*s) as a function of shear rate (1/s) for the fluids containing cat CNF as the second polymer. As can be seen, as the concentration of cat CNF increased, the viscosity increased. Moreover, the fluids exhibited a shear thinning behavior as the shear rate increased.

FIGS. 5A-5D are graphs of storage modulus (G') and loss modulus (G") for the fluids containing cat CNF as the second polymer. As can be seen in the graphs, the fluids exhibited viscoelastic behavior. As observed in FIGS. 4 and 5A-5D, the incremental increase in the apparent viscosity can be observed with addition of cat CNF. However, no significant changes in viscosity where observed for additions of cat CNF greater than 0.1% wt. Finally, gel-type behavior was observed after cat CNF additions of more than 0.1% wt.

Figure 6:
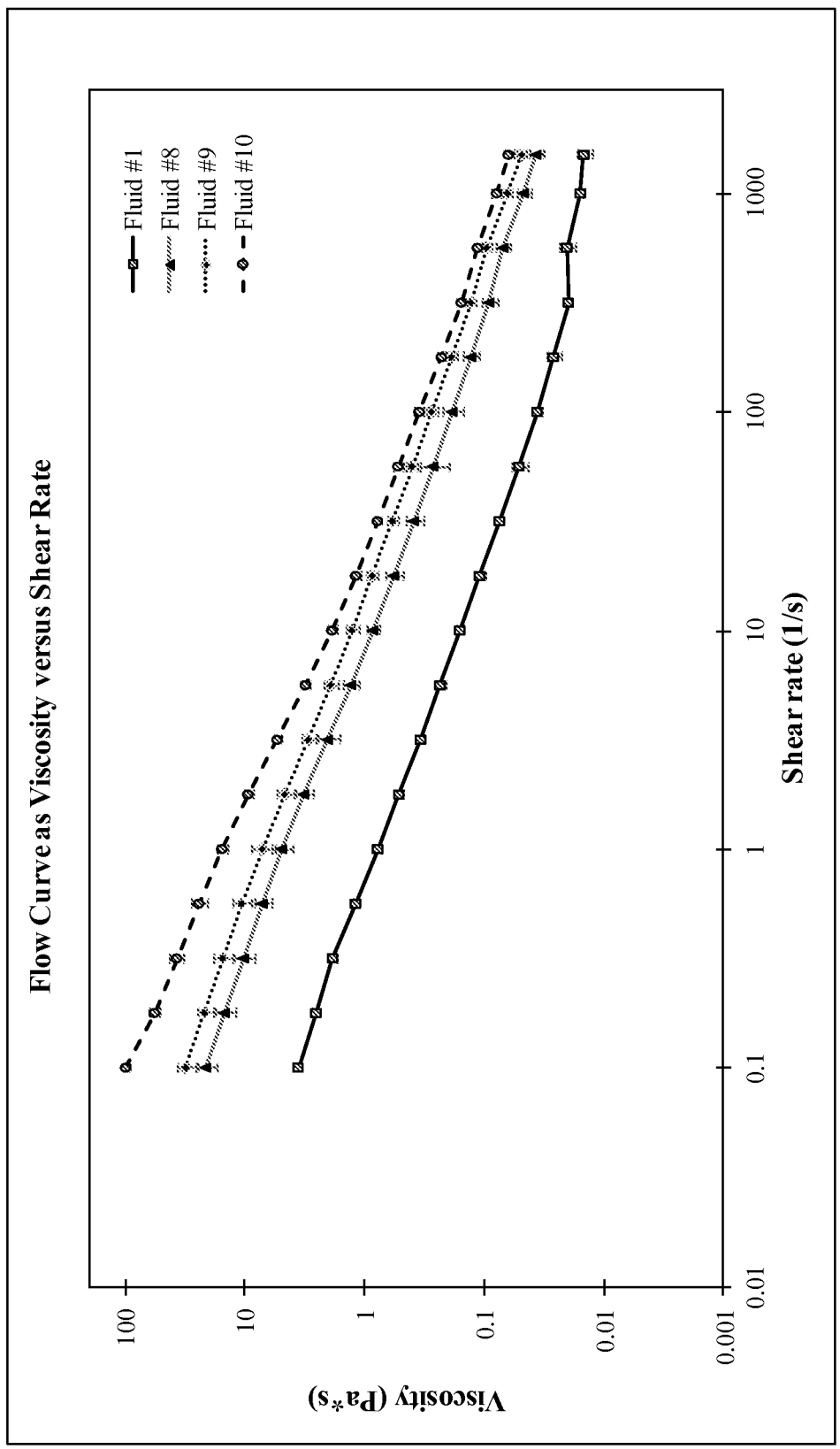
FIG. 6 is a graph of a Flow Curve as viscosity in Pascal*seconds versus shear rate in 1/seconds for 4 different fluids containing methylcellulose as the second polymer.
Figure 7A:
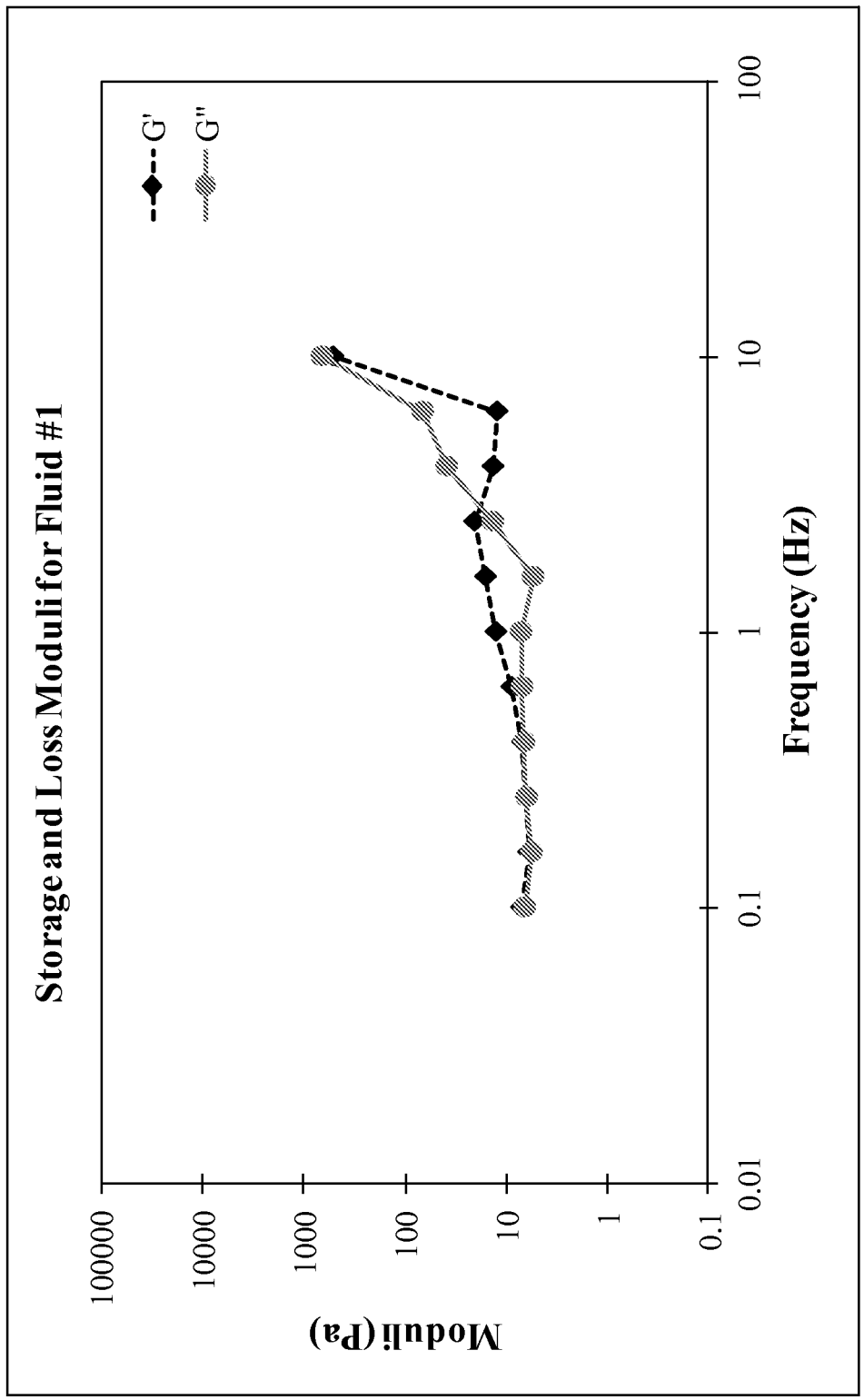
FIGS. 7A-7D are graphs of storage and loss moduli for the fluids from FIG. 6.
Figure 7B:
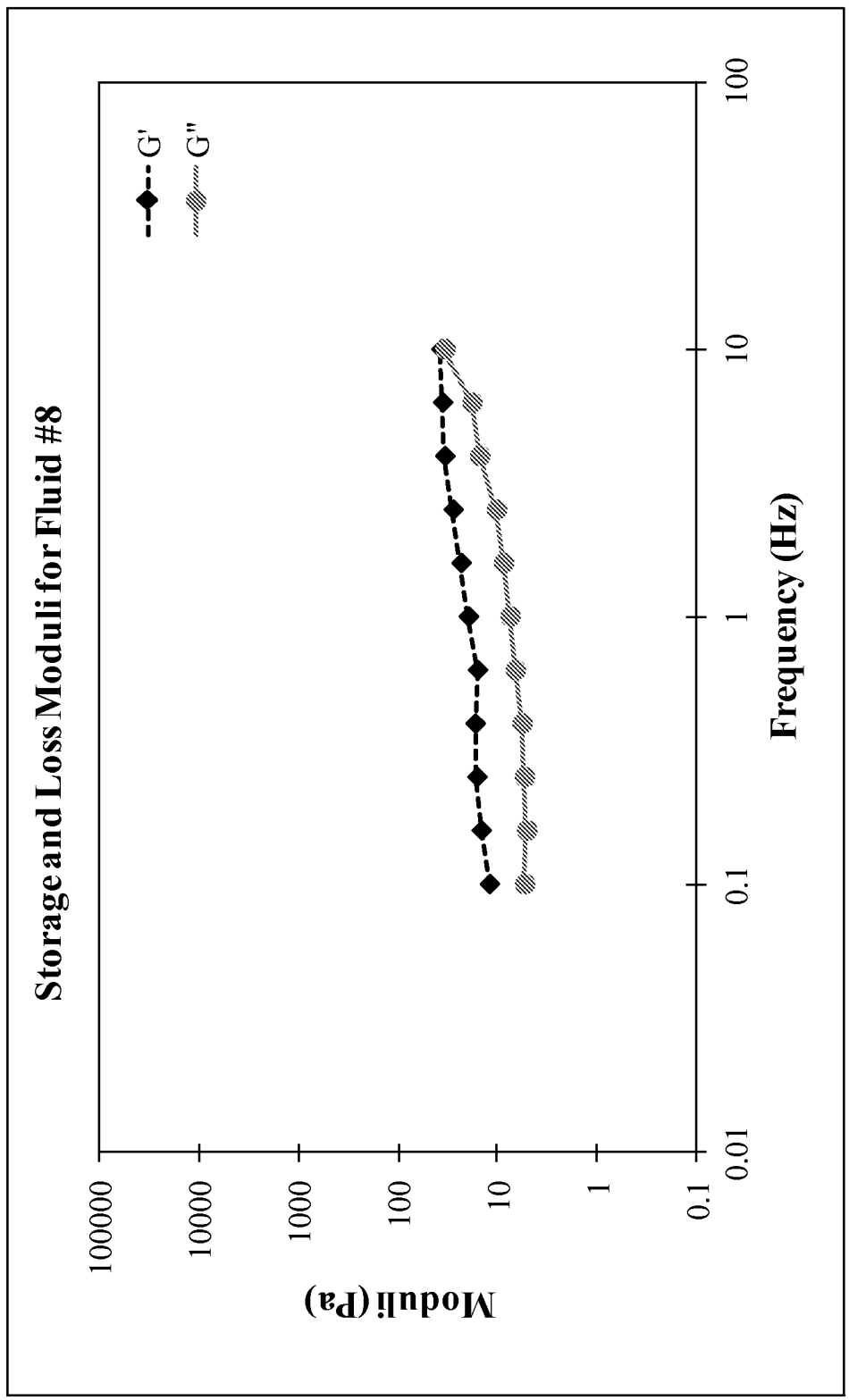
Figure 7C:
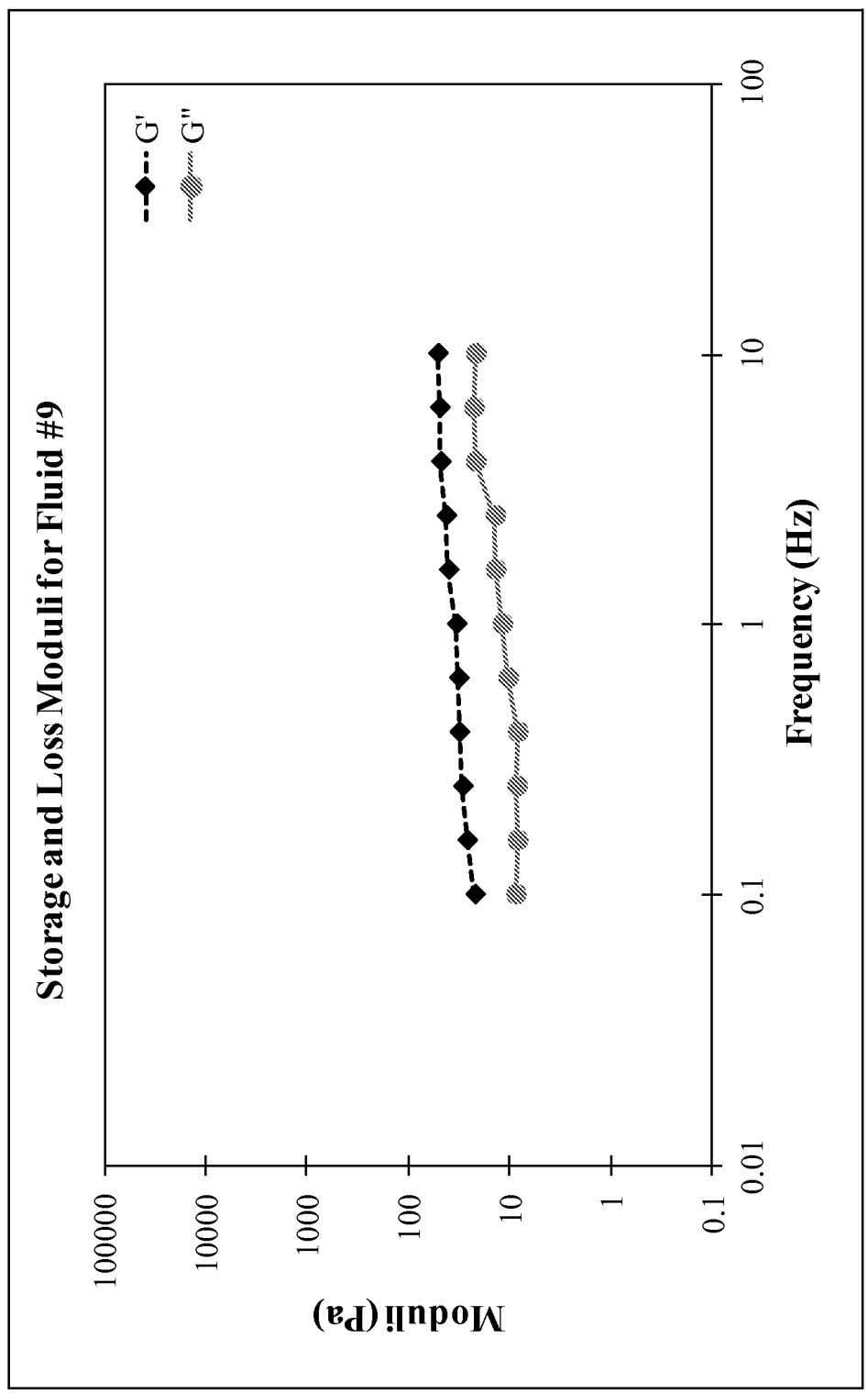
Figure 7D:
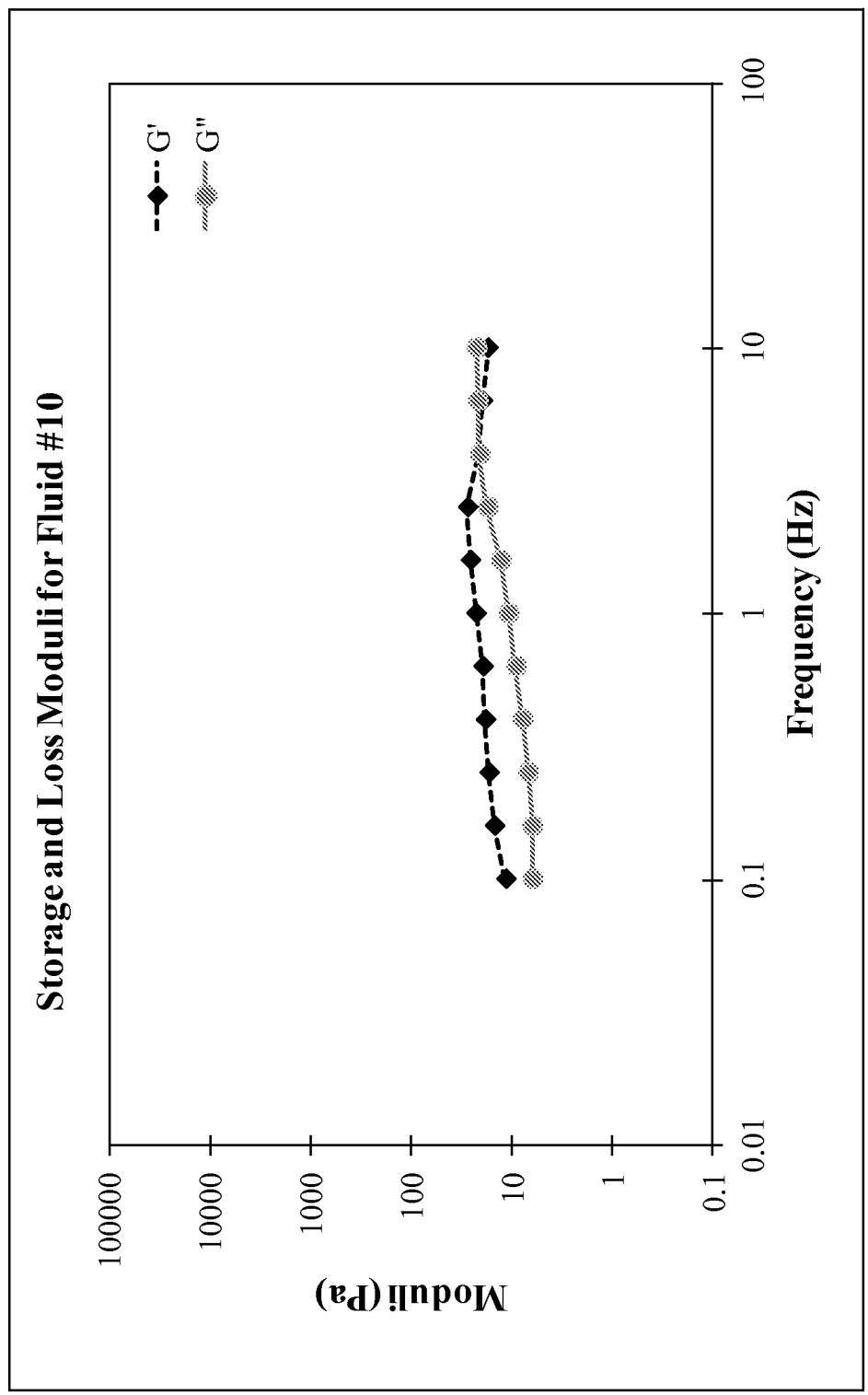

FIG. 6 is a graph of apparent viscosity (Pa*s) as a function of shear rate (1/s) for the fluids containing methylcellulose (MC) as the second polymer. As can be seen, as the concentration of MC increased, the viscosity increased. Moreover, the fluids exhibited a shear thinning behavior as the shear rate increased.

FIGS. 7A-7D are graphs of storage modulus (G') and loss modulus (G") for the fluids containing methylcellulose (MC) as the second polymer. As can be seen in the graphs, the fluids exhibited viscoelastic behavior. As observed in FIGS. 6 and 7A-7D, the addition of MC has a dramatic increase in the viscosity of the fluids. In addition, the fluids containing MC exhibited viscoelastic behavior and can be considered to have gel-type behavior. No significant differences in viscoelastic behavior of the fluids were observed when the concentration of MC was increased at given threshold values.

Figure 8A:
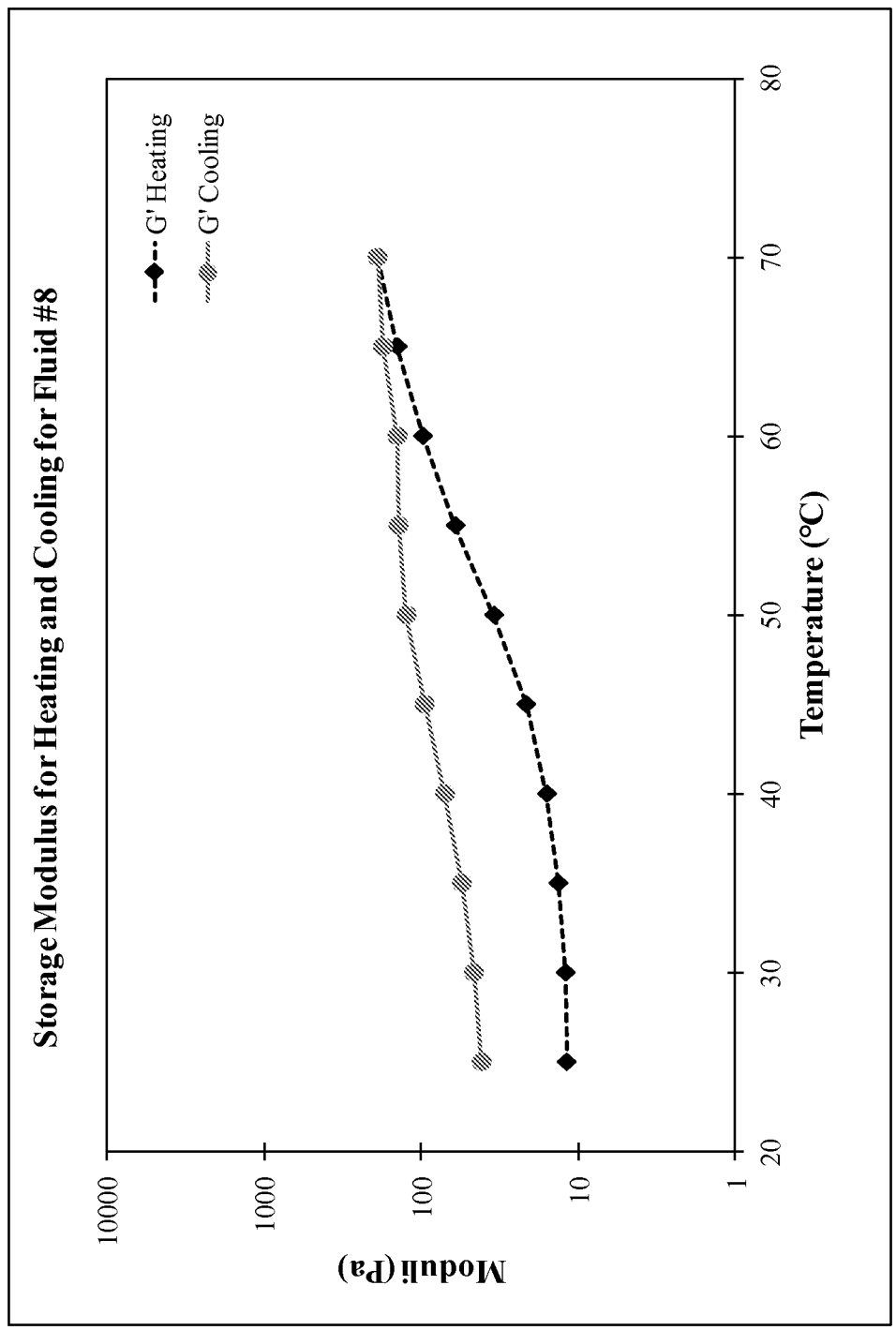
FIGS. 8A-8B are graphs of loss modulus for heating and cooling for two of the fluids from FIG. 6.
Figure 8B:
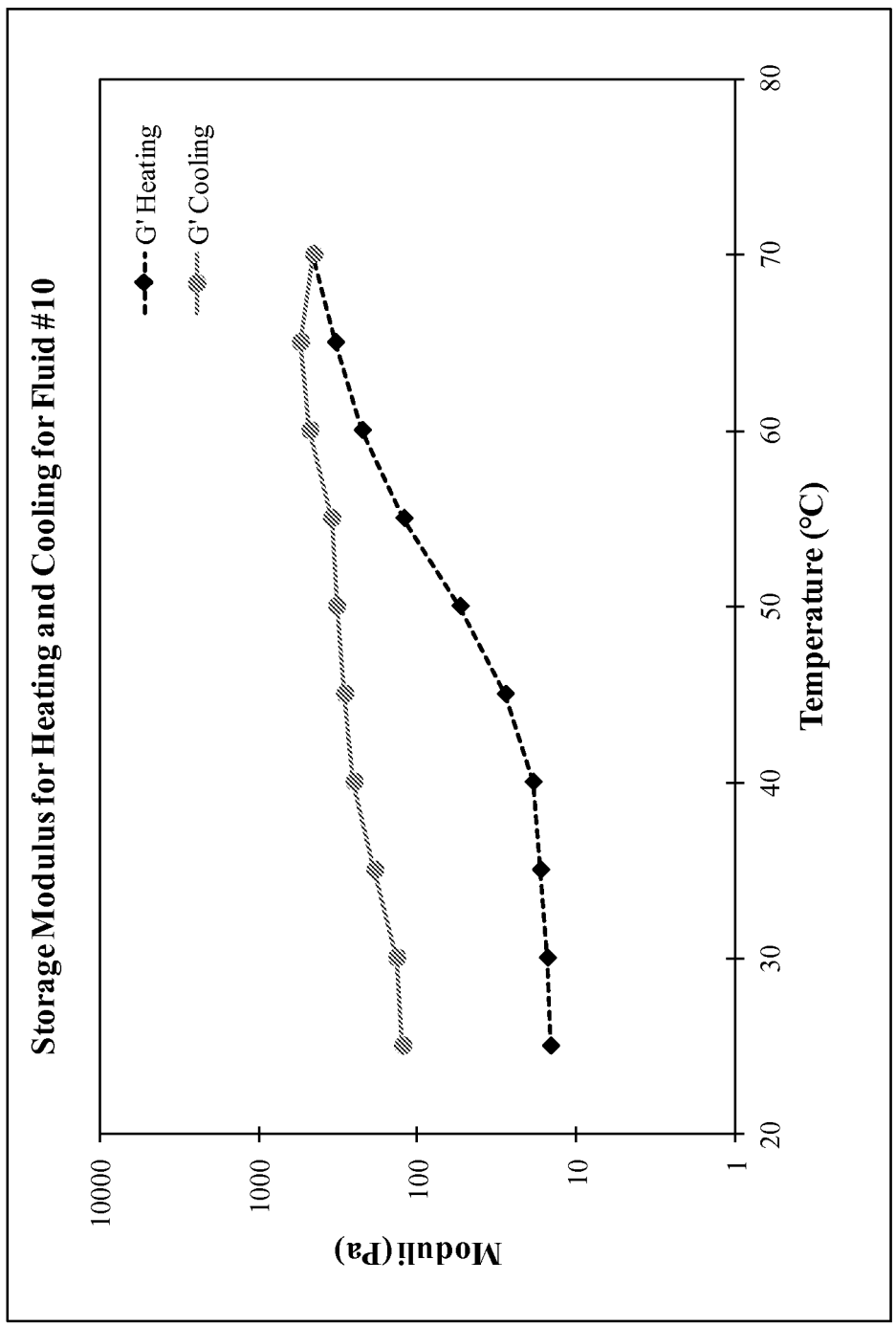

FIGS. 8A-8B are graphs of storage modulus (G') and the effect of heating and cooling for the fluids containing methylcellulose (MC) as the second polymer. As can be seen in the graphs, the fluids exhibited viscoelastic behavior. The viscoelasticity of the fluids increased with temperature. The change in viscoelasticity was partially reversible when the fluids were cooled down to the original starting temperatures. This reversibility was diminished however when the concentration of MC was increased.

Figure 9:
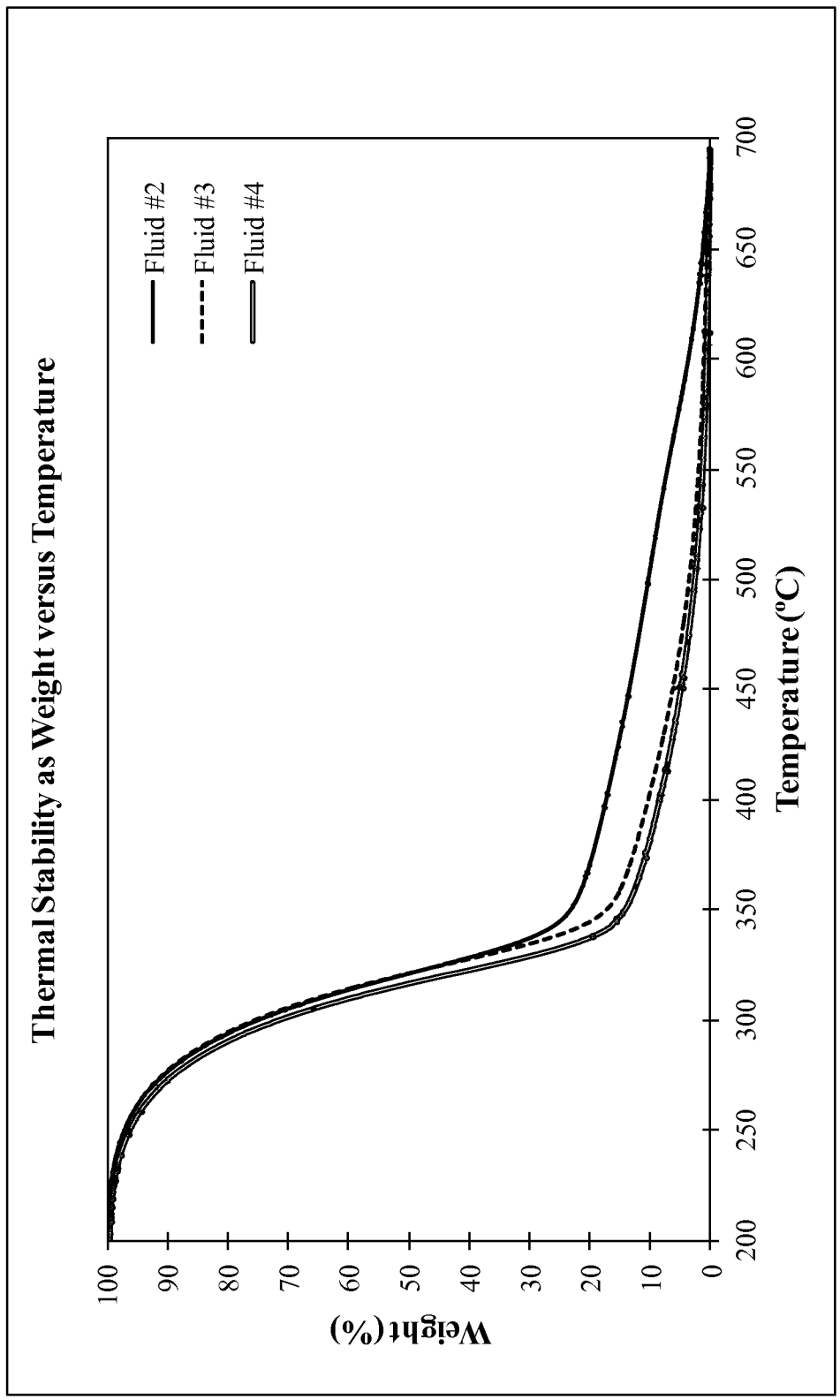
FIG. 9 is a graph of the thermal stability as weight (%) versus temperature in ° C. for 3 of the fluids from FIG. 2.

FIG. 9 is a graph of the thermal stability as weight (%) versus temperature (° C.) for the fluids containing chitosan as the second polymer. As can be seen in the graph, there is no significant difference in the thermal stability of the control fluid containing only the first polymer and the fluids containing the chitosan. This indicates that the addition of chitosan does not appreciably increase or decrease the thermal stability of the additive.

Figure 10:
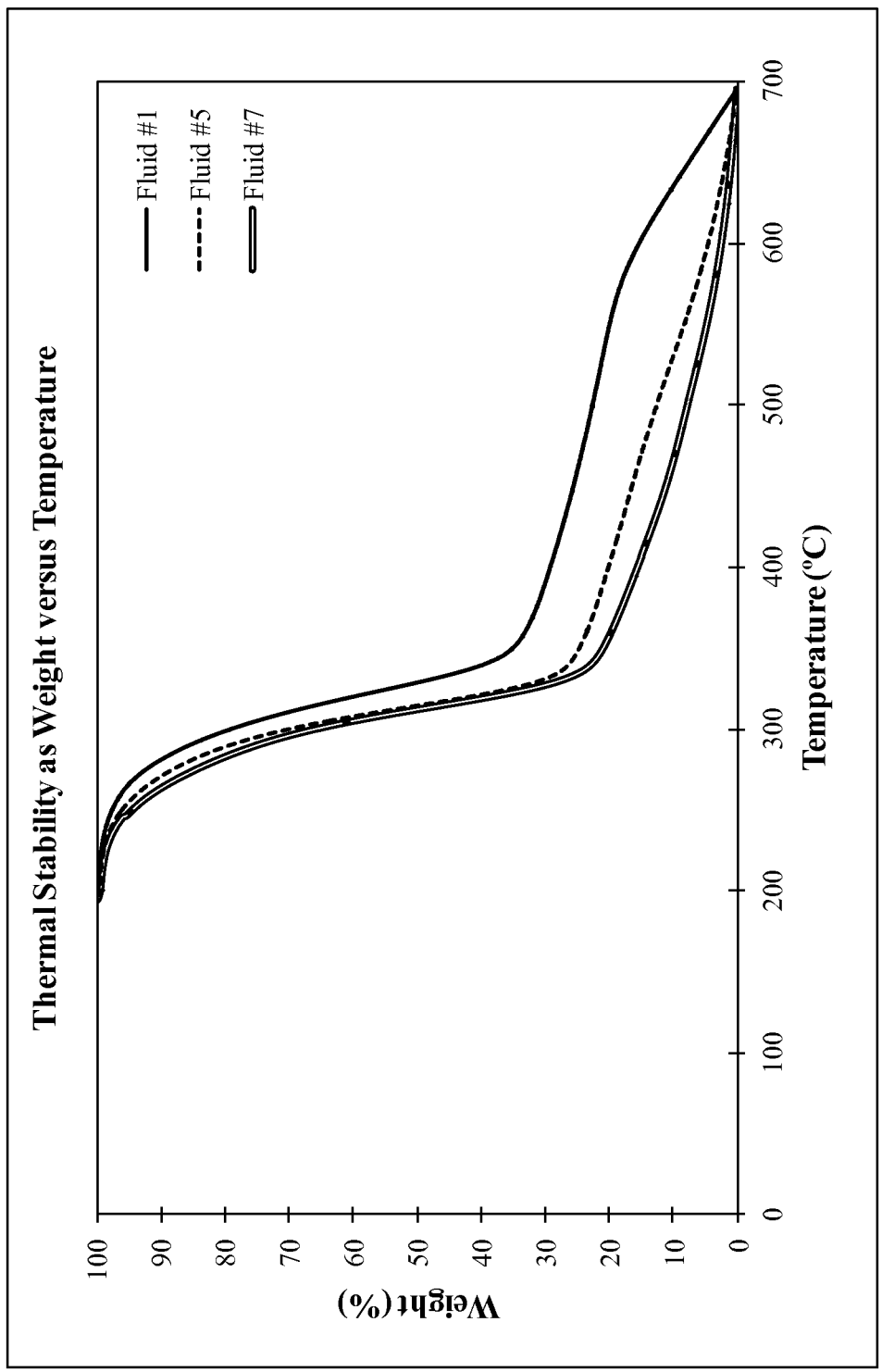
FIGS. 10 & 11 are graphs of the thermal stability as weight (%) versus temperature in ° C. for some of the fluids from FIG. 4 in nitrogen and air, respectively.
Figure 11:
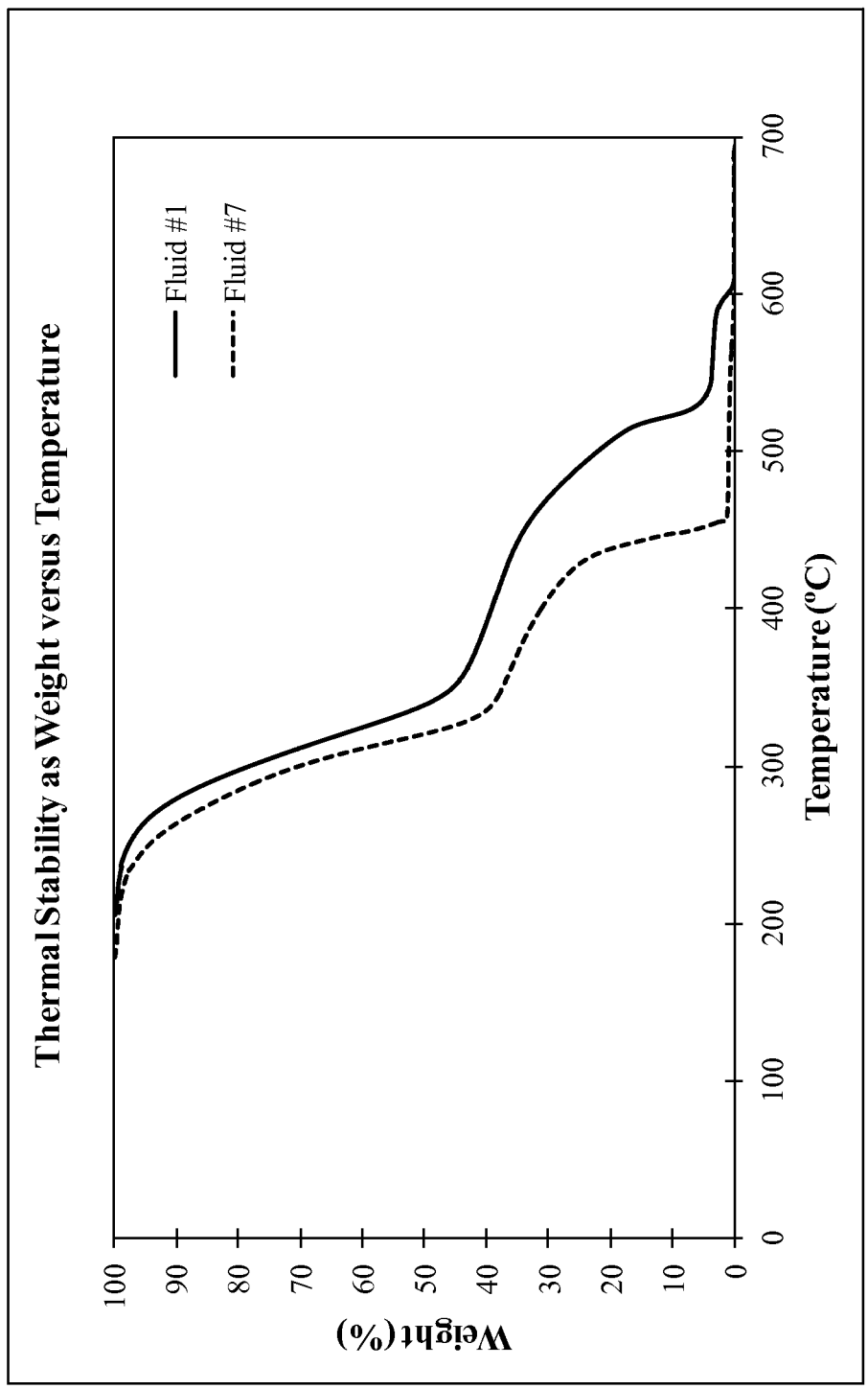

FIGS. 10 & 11 is a graph of the thermal stability as weight (%) versus temperature (° C.) for the fluids containing cat CNF as the second polymer. As can be seen in FIG. 10, there is a slight decrease in the thermal stability of the fluids containing the cat CNF compared to the control Fluid #1. This indicates that the addition of cat CNF does not appreciably affect the thermal stability of the additive. FIG. 11 is the thermal stability under oxidative atmosphere (Air); whereas, FIG. 10 is under nitrogen gas conditions. The results indicate that the onset point of the additive is higher in nitrogen than in air. This can mean that oxidation of the additive can decrease the thermal stability of the additive.

Figure 12:
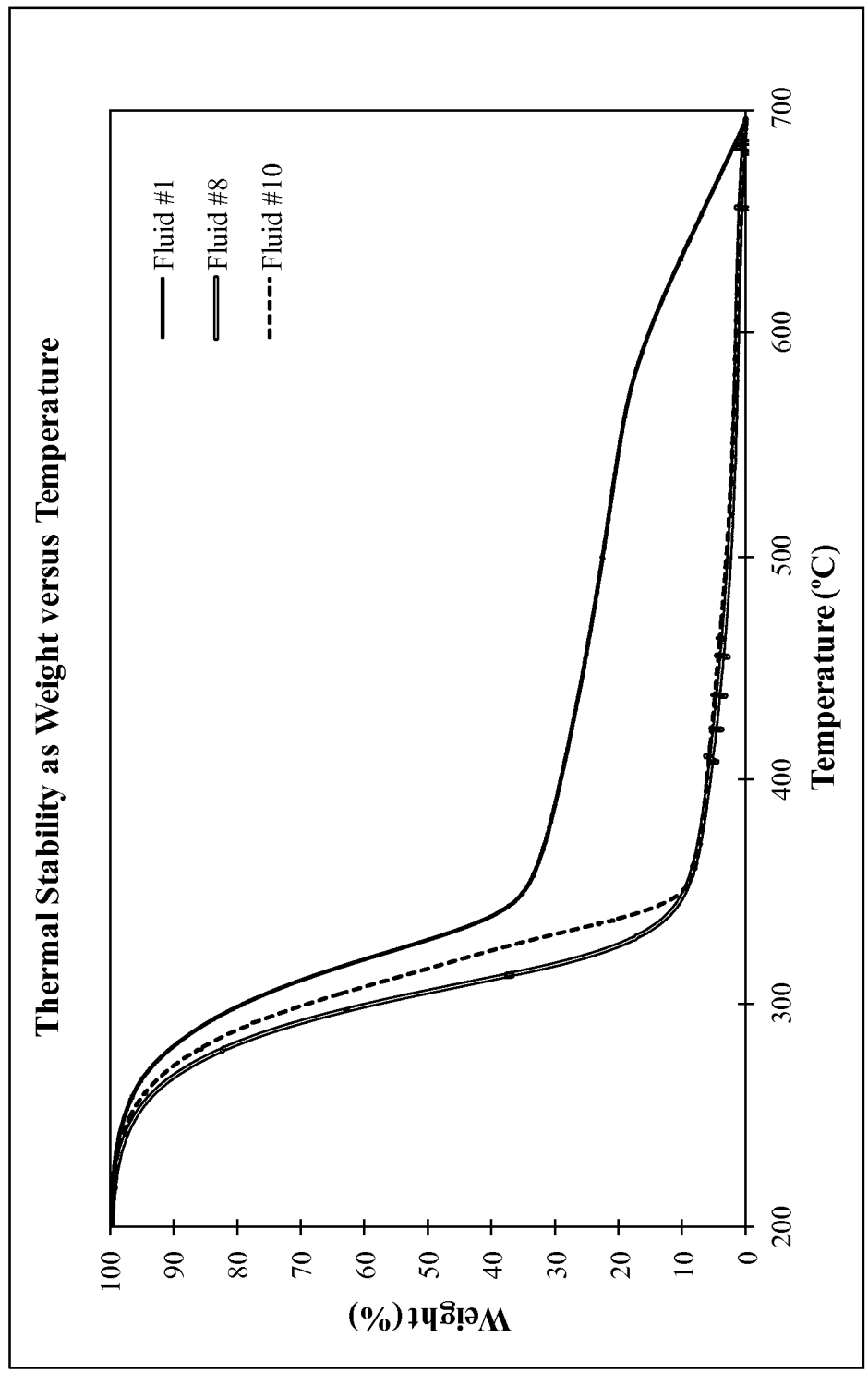
FIG. 12 is a graph of the thermal stability as weight (%) versus temperature in ° C. for some of the fluids from FIG. 6.

FIG. 12 is a graph of the thermal stability as weight (%) versus temperature (° C.) for the fluids containing methylcellulose (MC) as the second polymer. As can be seen in the graph, there is a slight decrease in the thermal stability of the fluids containing the MC compared to the control Fluid #1. This indicates that the addition of MC does affect the thermal stability of the additive, but not greatly.

Figure 13:
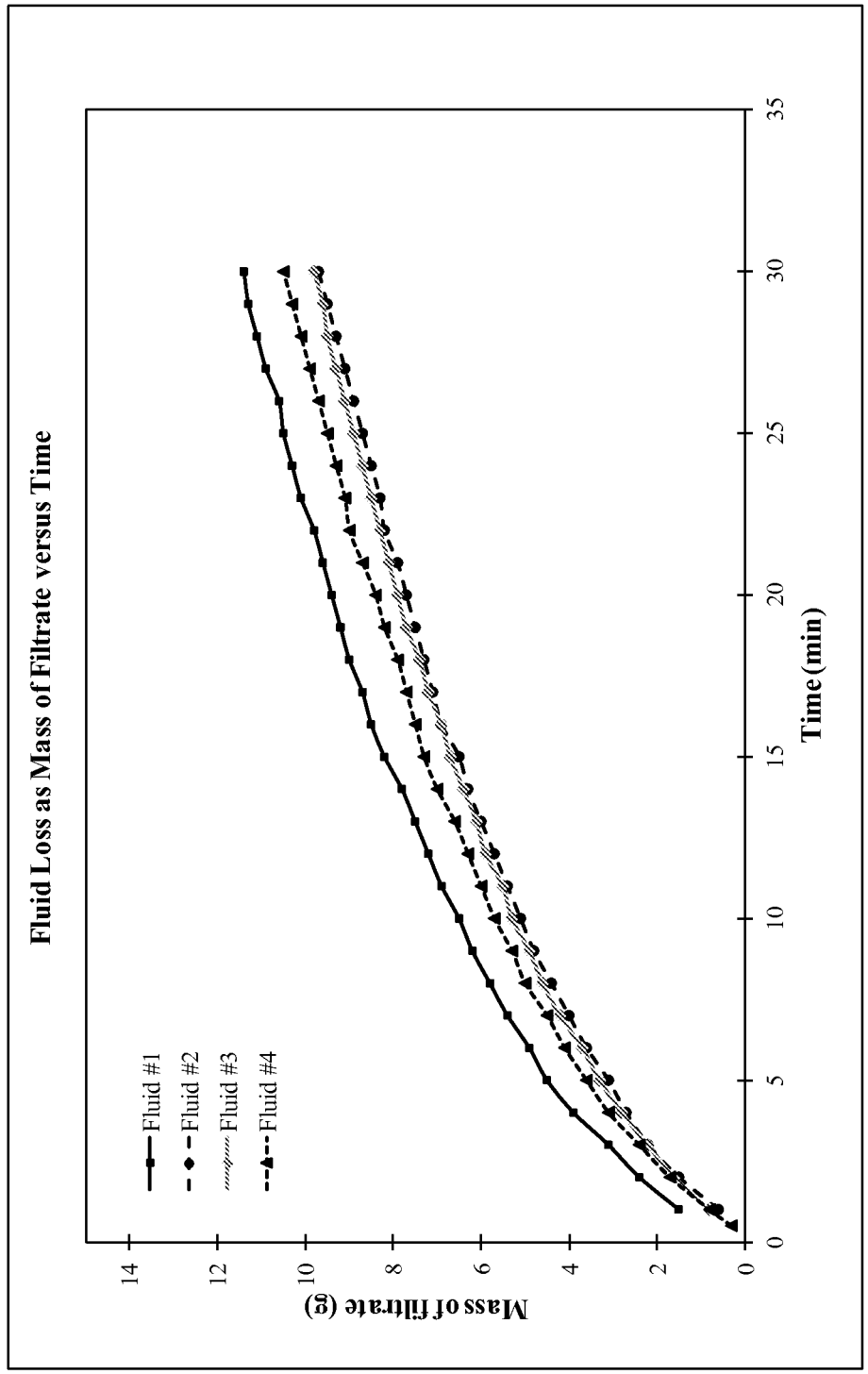
FIG. 13 is a graph of the fluid loss as mass of filtrate in grams versus time in minutes for the fluids from FIG. 2.

FIG. 13 is a graph of fluid loss in mass of filtrate (g) versus time (min) for the fluids containing chitosan as the second polymer. Fluid loss was performed at a temperature of 77° F. (25° C.) and a pressure differential of 100 psi. As can be seen, as the concentration of chitosan increased the amount of fluid loss decreased. Even though the fluids did not have a fluid loss of less than 2 g/30 min, the fluids only contained water and the additive polymer instead of being a fully-formulated wellbore treatment fluid including other commonly-used additives. It is theorized that a fully-formulated fluid would demonstrate acceptable fluid loss values.

Figure 14:
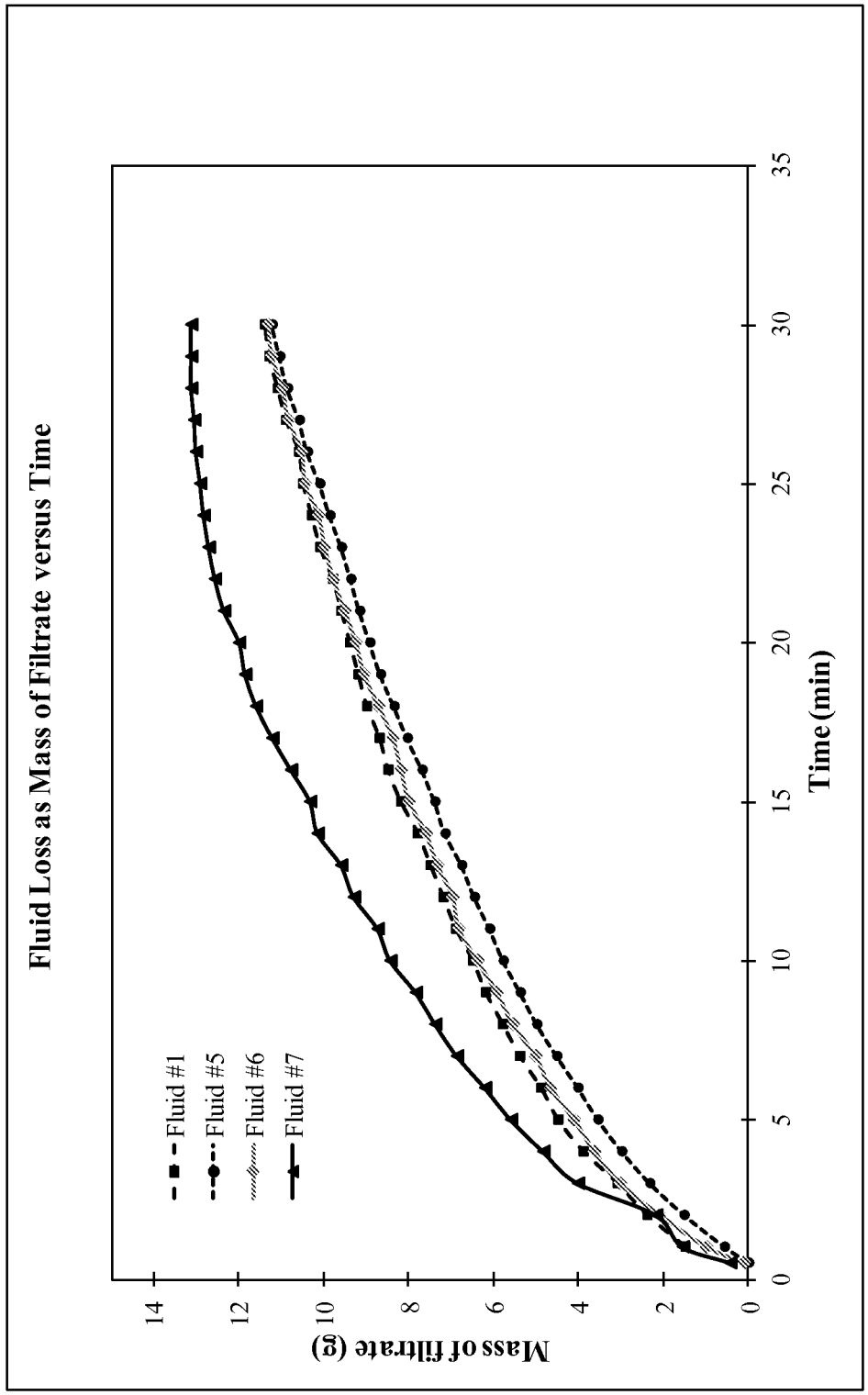
FIG. 14 is a graph of the fluid loss as mass of filtrate in grams versus time in minutes for the fluids from FIG. 4.

FIG. 14 is a graph of fluid loss in mass of filtrate (g) versus time (min) for the fluids containing cat CNF as the second polymer. As can be seen, as the concentration of cat CNF increased, the amount of fluid loss decreased. It can be concluded that a low level of addition of cat CNF reduces the amount of fluid loss; however, and interestingly, a high level of addition of cat CNF increased the amount of fluid loss. This phenomenon is related to the neutralization of C-CNF charges by the cat CNF. Even though the fluids did not have a fluid loss of less than 2 g/30 min, the fluids only contained water and the additive polymer instead of being a fully-formulated wellbore treatment fluid including other commonly-used additives. It is theorized that a fully-formulated fluid would demonstrate acceptable fluid loss values.

Figure 15:
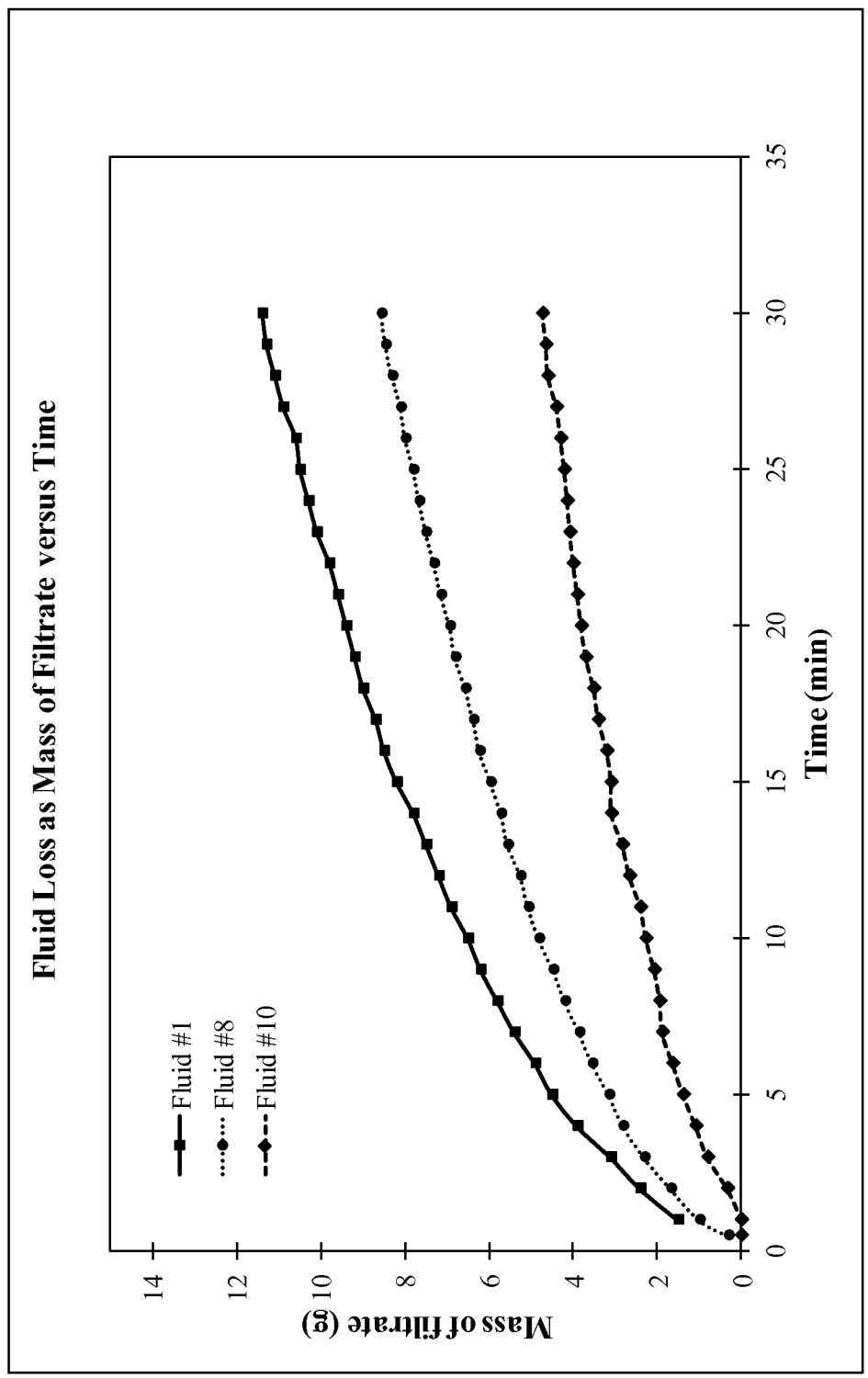
FIG. 15 is a graph of the fluid loss as mass of filtrate in grams versus time in minutes for the fluids from FIG. 6.

FIG. 15 is a graph of fluid loss in mass of filtrate (g) versus time (min) for the fluids containing methylcellulose (MC) as the second polymer. As can be seen, as the concentration of MC increased the amount of fluid loss decreased. The second polymer of MC in a concentration of 0.5% by weight of the C-CNF provided the best fluid loss values out of all the fluids. Even though the fluids did not have a fluid loss of less than 2 g/30 min, the fluids only contained water and the additive polymer instead of being a fully-formulated wellbore treatment fluid including other commonly-used additives. It is theorized that a fully-formulated fluid would demonstrate acceptable fluid loss values.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a wellbore comprising: introducing a treatment fluid into the wellbore, the treatment fluid comprising:
    (A) a base fluid; and
    (B) an additive consisting of:
        (i) a first polymer bundle selected from the group consisting of cellulose nanofibrils, cellulose nanocrystals, and combinations thereof; and
        (ii) a second polymer, wherein the second polymer attaches to the first polymer bundle by a non-covalent mechanism, wherein the second polymer comprises a cationic polyelectrolytes containing primary, secondary, tertiary or quaternary amino groups, selected from the group consisting of cationic polyacrylamides (CPAMs), cationic starch, poly(diallyldimethyl ammonium chloride), and epichlorohydrin/dimethylamine polymers;
    wherein a ratio of the second polymer to the first polymer bundle is about 0.5:1 to about 4:1, wherein the treatment fluid has a fluid loss of less than 5 grams in 30 minutes at a differential pressure of 100 psi.

2. The method according to claim 1, wherein the base fluid comprises water.

3. The method according to claim 2, wherein the water is selected from the group consisting of freshwater, saltwater, sea water, brackish water, and combinations thereof.

4. The method according to claim 1, wherein the base fluid further comprises a water-soluble salt.

5. The method according to claim 1, wherein the first polymer bundle and second polymer form a polymer network.

6. The method according to claim 5, wherein the first polymer bundle forms the backbone of the polymer network.

7. The method according to claim 1, wherein the second polymer attaches to the first polymer bundle via hydrogen bonding through hydroxyl groups on the first polymer, dispersion, van der Waals forces, dipole forces, and other forces, or mechanical entanglement.

8. The method according to claim 1, wherein the second polymer has an affinity to the first polymer.

9. The method according to claim 8, wherein the affinity occurs due to opposite charges wherein the second polymer has cationic functional groups and the first polymer bundle has anionic functional groups.

10. The method according to claim 8, wherein the affinity occurs due to an attraction of one or more functional groups of the first polymer bundle and the second polymer.

11. The method according to claim 1, wherein the second polymer is in a concentration in the range of about 0.1% to about 2% by weight of the first polymer.

12. The method according to claim 1, wherein the additive is in a concentration in the range of about 0.1% to about 5% by weight of the base fluid.

13. The method according to claim 1, wherein the additive is a viscosifier, a gelling agent, a rheology modifier, or a fluid loss control additive.

14. The method according to claim 1, wherein the treatment fluid is a drilling fluid, a drill-in fluid, a packer fluid, a completion fluid, a spacer fluid, a work-over fluid, an insulating fluid, a cement composition, or a stimulation fluid.

15. The method according to claim 1, wherein the drilling fluid is mixed with mixing equipment.

16. The method according to claim 1, wherein the step of introducing comprises pumping the treatment fluid into the wellbore using pumping equipment.

\* \* \* \* \*